US011403691B2

(12) United States Patent
Yamauchi et al.

(10) Patent No.: US 11,403,691 B2
(45) Date of Patent: Aug. 2, 2022

(54) CONTROL METHOD AND INFORMATION PROCESSING APPARATUS

(71) Applicant: Panasonic Intellectual Property Corporation of America, Torrance, CA (US)

(72) Inventors: Masaki Yamauchi, San Jose, CA (US); Nanami Fujiwara, Santa Clara, CA (US); Mitsuru Endo, Tokyo (JP); Ryota Uchida, Tokyo (JP); Motoji Ohmori, Osaka (JP); Koji Honda, Kyoto (JP); Masato Murayama, Osaka (JP); Hiroki Takeuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 121 days.

(21) Appl. No.: 16/458,918

(22) Filed: Jul. 1, 2019

(65) Prior Publication Data

US 2020/0013104 A1    Jan. 9, 2020

Related U.S. Application Data

(60) Provisional application No. 62/782,507, filed on Dec. 20, 2018, provisional application No. 62/693,601, (Continued)

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0631* (2013.01); *G06Q 10/087* (2013.01)

(58) Field of Classification Search
CPC .... G06Q 30/00; G06Q 30/06; G06Q 30/0631; G06Q 10/00; G06Q 10/08; G06Q 10/087; G06Q 30/0601–0645; G06Q 30/08
(Continued)

(56) References Cited

U.S. PATENT DOCUMENTS 9,965,798 B1 *   5/2018   Vaananen ............. F25D 27/005
2014/0252091 A1 *   9/2014   Morse .................. G06Q 10/087
235/385
(Continued)

FOREIGN PATENT DOCUMENTS

JP    2018-32272    3/2018

OTHER PUBLICATIONS

Takahashi, Dean, Jan. 3, 2017, Smarter's FridgeCam can guess when your food expires, venturebeat.com, accessed on Jan. 13, 2021, accessed at [https://venturebeat.com/2017/01/03/smarters-fridgecam-tells-you-when-your-food-will-expire/] (Year: 2017).*

*Primary Examiner* — Jeffrey A. Smith
*Assistant Examiner* — Lindsey B Smith
(74) *Attorney, Agent, or Firm* — Wenderoth, Lind & Ponack, L.L.P.

(57) ABSTRACT

A control method for an information processing apparatus including a processor includes: obtaining information about an amount of an item stored in a storage structure; determining whether the information about the amount of the item satisfies a first condition or not, the first condition indicating that the amount of the item is less than or equal to a given amount; and, when the first condition is satisfied, displaying, on a display, a screen including: information about the item; information related to the amount of the item, indicating that the amount of the item is less than or equal to the given amount; and a purchase suggestion for a product corresponding to the item.

6 Claims, 44 Drawing Sheets

Related U.S. Application Data filed on Jul. 3, 2018, provisional application No. 62/693,610, filed on Jul. 3, 2018.

(58) Field of Classification Search
USPC ............ 705/22, 28, 26.1–27.2; 235/381, 385
See application file for complete search history.

(56) References Cited

U.S. PATENT DOCUMENTS

| | | | |
|---|---|---|---|
| 2017/0039511 A1* | 2/2017 | Corona | G06K 9/6267 |
| 2017/0186074 A1* | 6/2017 | Lee | G06F 3/04886 |
| 2017/0219276 A1* | 8/2017 | Wang | G06V 10/454 |
| 2017/0219278 A1* | 8/2017 | Hui | F25D 25/027 |
| 2018/0025405 A1* | 1/2018 | Jones | G06Q 30/0631 |
| | | | 705/26.7 |
| 2018/0342329 A1* | 11/2018 | Rufo | H04L 12/2812 |
| 2019/0164117 A1* | 5/2019 | Wallace | H04L 12/2829 |
| 2019/0165967 A1* | 5/2019 | Wallace | G06Q 10/087 |
| 2019/0295148 A1* | 9/2019 | Lefkow | G06Q 10/087 |
| 2020/0034907 A1* | 1/2020 | Silverstein | G06Q 30/018 |

* cited by examiner

FIG. 5

| DATE & TIME | ITEM ID | ITEM AMOUNT |
|---|---|---|
| 14:00:35 3/30/2018 | 001 | 3 |
| 15:00:35 3/30/2018 | 002 | 100 g |
| 18:00:35 3/30/2018 | 003 | 60% |
| ... | ... | ... |

FIG. 6

| ITEM ID | GIVEN AMOUNT |
|---------|--------------|
| 001     | 1            |
| 002     | 50 g         |
| 003     | 20%          |
| ...     | ...          |

FIG. 8

| PRODUCT ID | ITEM ID | PRODUCT INFORMATION 1 | PRODUCT INFORMATION 2 | PRODUCT INFORMATION 3 | PRODUCT INFORMATION 4 |
|---|---|---|---|---|---|
| AAA | 001 | PRODUCT NAME A | PRODUCT IMAGE A | PRODUCT CONTENT INFORMATION A | PRODUCT A PRICE |
| BBB | 001 | PRODUCT NAME B | PRODUCT IMAGE B | PRODUCT CONTENT INFORMATION B | PRODUCT B PRICE |
| CCC | 001 | PRODUCT NAME C | PRODUCT IMAGE C | PRODUCT CONTENT INFORMATION C | PRODUCT C PRICE |
| DDD | 001 | PRODUCT NAME D | PRODUCT IMAGE D | PRODUCT CONTENT INFORMATION D | PRODUCT D PRICE |
| EEE | 001 | PRODUCT NAME E | PRODUCT IMAGE E | PRODUCT CONTENT INFORMATION E | PRODUCT E PRICE |
| FFF | 002 | PRODUCT NAME F | PRODUCT IMAGE F | PRODUCT CONTENT INFORMATION F | PRODUCT F PRICE |
| ... | ... | ... | ... | ... | ... |

FIG. 16

| ITEM ID | USAGE AMOUNT PER USE | RETURNABLE |
|---|---|---|
| 001 | — | NO |
| 002 | 20 g | YES |
| 003 | 10% | YES |
| ... | ... | ... |

FIG. 24

| ORDER DATE & TIME | ORDERED ITEM ID | DELIVERY STATUS |
|---|---|---|
| 14:00:35 3/29/2018 | 001 | DELIVERED |
| 20:00:35 3/30/2018 | 002 | UNDELIVERED |
| 18:00:35 3/30/2018 | 003 | UNDELIVERED |
| ... | ... | ... |

Time 20:30:35 3/30/2018

FIG. 25

| ORDER | SHIPPING | DETERMINATION RESULT |
|---|---|---|
| NO | — | CONDITION NOT SATISFIED |
| YES | UNDELIVERED | CONDITION SATISFIED |
| YES | DELIVERED | CONDITION NOT SATISFIED |

FIG. 29

| USER ID | PURCHASING AUTHORITY |
|---------|----------------------|
| A | YES |
| B | NO |
| C | YES |
| ... | ... |

FIG. 31

| TERMINAL ID | PURCHASING AUTHORITY |
|---|---|
| A1 | YES |
| B2 | NO |
| C3 | YES |
| ... | ... |

FIG. 32

| ITEM ID | EXPIRATION DATE |
|---------|-----------------|
| 001 | 3/26/2018 |
| 002 | 4/05/2018 |
| 003 | 4/10/2018 |
| ... | ... |

Date: 3/25/2018

FIG. 33

| ITEM ID | LENGTH OF GIVEN PERIOD |
|---|---|
| 001 | 1 DAY |
| 002 | 2 DAYS |
| 003 | 5 DAYS |
| ... | ... |

CONTROL METHOD AND INFORMATION PROCESSING APPARATUS

CROSS REFERENCE TO RELATED APPLICATION

This application claims the benefit of U.S. Provisional Patent Application No. 62/693,601 filed Jul. 3, 2018, U.S. Provisional Patent Application No. 62/693,610 filed Jul. 3, 2018, and U.S. Provisional Patent Application No. 62/782,507 filed Dec. 20, 2018, the entire contents of which are hereby incorporated by reference.

BACKGROUND

1. Technical Field

The present disclosure relates to an information processing apparatus and a control method thereof for processing information related to an item stored in a storage structure.

2. Description of the Related Art

Conventionally, there is a service that suggests the purchase of a product to a user. For example, Japanese Unexamined Patent Application Publication No. 2018-32272 discloses determining the timing at which to provide a service related to a product to a user, based on information related to a change in weight of the product detected by a predetermined sensor in a dwelling space of the user.

SUMMARY

However, with the above conventional technique, it is difficult to effectively present the user with information for purchasing a product.

In view of this, the present disclosure provides, for example, a control method that can effectively present the user with information for purchasing a product.

A control method according to one aspect of the present disclosure is a control method for an information processing apparatus including a processor. The processor: (a) obtains information about at least one of an amount and an expiration of an item stored in a storage structure; (b) determines whether the information about at least one of the amount and the expiration of the item satisfies a first condition or not, the first condition indicating at least one of that the amount of the item is less than or equal to a given amount and that the expiration of the item falls within a given period; and (c) when the first condition is satisfied, displays, on a display, a screen including: information about the item; at least one of (i) information related to the amount of the item, indicating that the amount of the item is less than or equal to the given amount and (ii) information related to the expiration of the item, indicating that the expiration of the item falls within the given period; and a purchase suggestion for a product corresponding to the item.

A control method according to one aspect of the present disclosure is a control method for an information processing apparatus including a processor. The processor: (j) obtains information about a first amount of an item stored in a first storage structure; (k) determines whether the information about the first amount of the item satisfies a first condition or not, the first condition indicating that the first amount of the item is less than or equal to a first given amount; (l) when the first condition is satisfied, obtains information about a second amount of the item stored in a second storage structure; (m) determines whether the information about the second amount of the item satisfies a second condition or not, the second condition indicating that the second amount of the item is less than or equal to a second given amount; (n) when the second condition is satisfied, displays, on a display, a screen including: information about the item; information related to the first amount of the item, indicating that the first amount of the item is less than or equal to the first given amount; and a purchase suggestion for a product corresponding to the item; and when the second condition is not satisfied, displays, on the display, a screen including the information about the item and information indicating that the item is stored in the second storage structure.

General or specific aspects of the present disclosure may be realized as a system, apparatus, integrated circuit, computer program, computer readable medium such as a CD-ROM, or any given combination thereof.

The control method according to one aspect of the present invention can effectively present the user with information for purchasing a product.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates one example of information about the amount of an item according to Embodiment 1;

FIG. 6 illustrates one example of given amount information according to Embodiment 1;

FIG. 8 illustrates one example of product information according to Embodiment 1;

FIG. 16 illustrates given amount information according to Variation 1 of Embodiment 1;

FIG. 24 illustrates one example of order and delivery information according to Embodiment 2;

FIG. 25 illustrates a second condition according to Embodiment 2;

FIG. 29 illustrates one example of purchasing authority information according to Embodiment 3;

FIG. 31 illustrates one example of purchasing authority information according to Variation 1 of Embodiment 3;

FIG. 32 illustrates one example of information about the expiration of an item according to Embodiment 4;

FIG. 33 illustrates one example of given period information according to Embodiment 4;

DETAILED DESCRIPTION OF THE EMBODIMENTS

Figure 1:
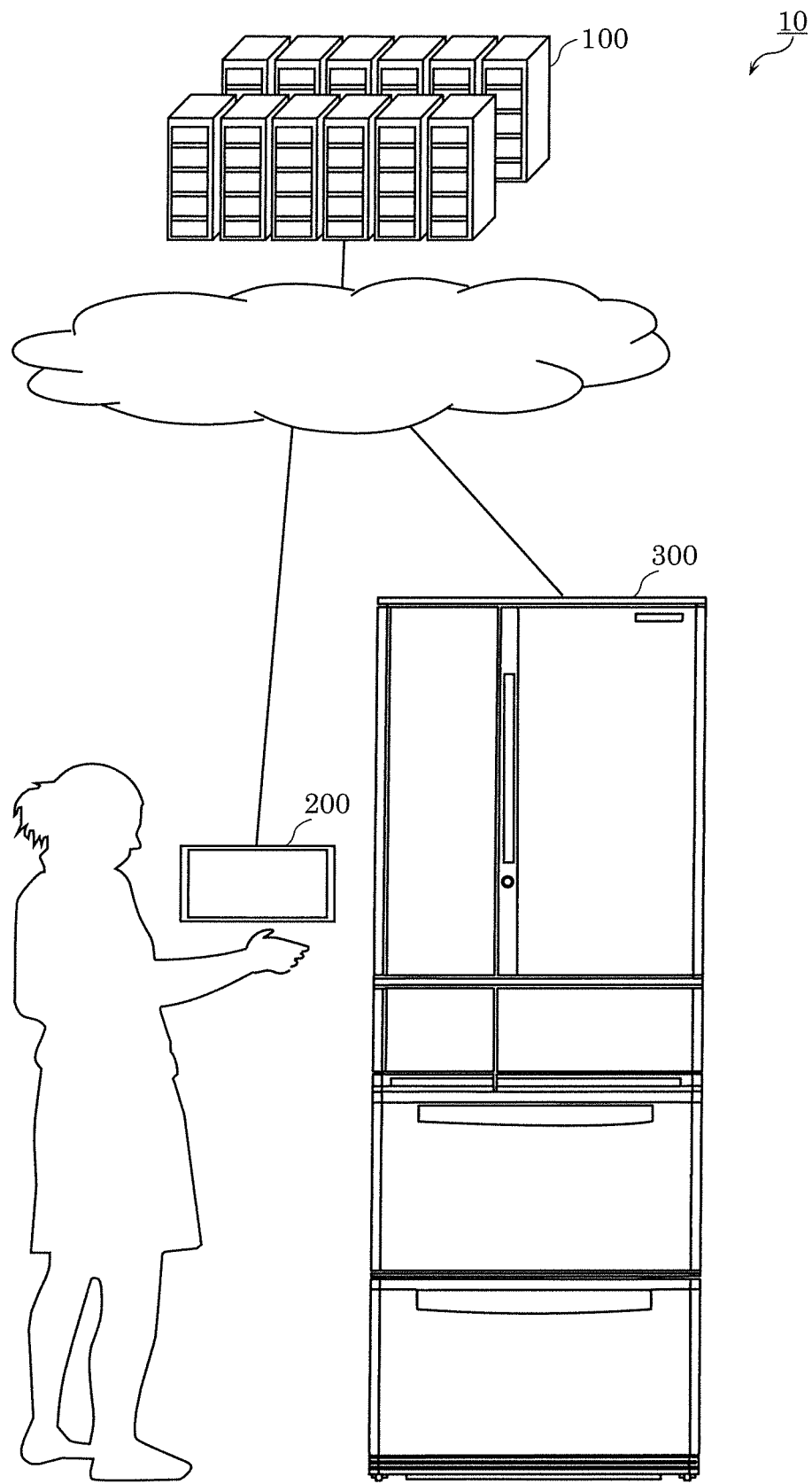
FIG. 1 is an external view illustrating an information processing system according to Embodiment 1 and a user.

Hereinafter, embodiments are specifically described with reference to the drawings.

Each of the embodiments described below shows a general or specific example. The numerical values, shapes, materials, elements, the arrangement and connection of the elements, steps, the processing order of the steps etc. in the following embodiments are mere examples, and thus do not limit the scope of the Claims. Moreover, among the elements in the following embodiments, those not recited in any one of the independent claims, indicating the broadest concept, are described as optional elements. Moreover, the drawings are not necessarily precise illustrations. Elements that are essentially the same share like reference signs in the drawings, and repeated description is omitted or simplified.

Embodiment 1

[Configuration of Information Processing System]

Figure 2:
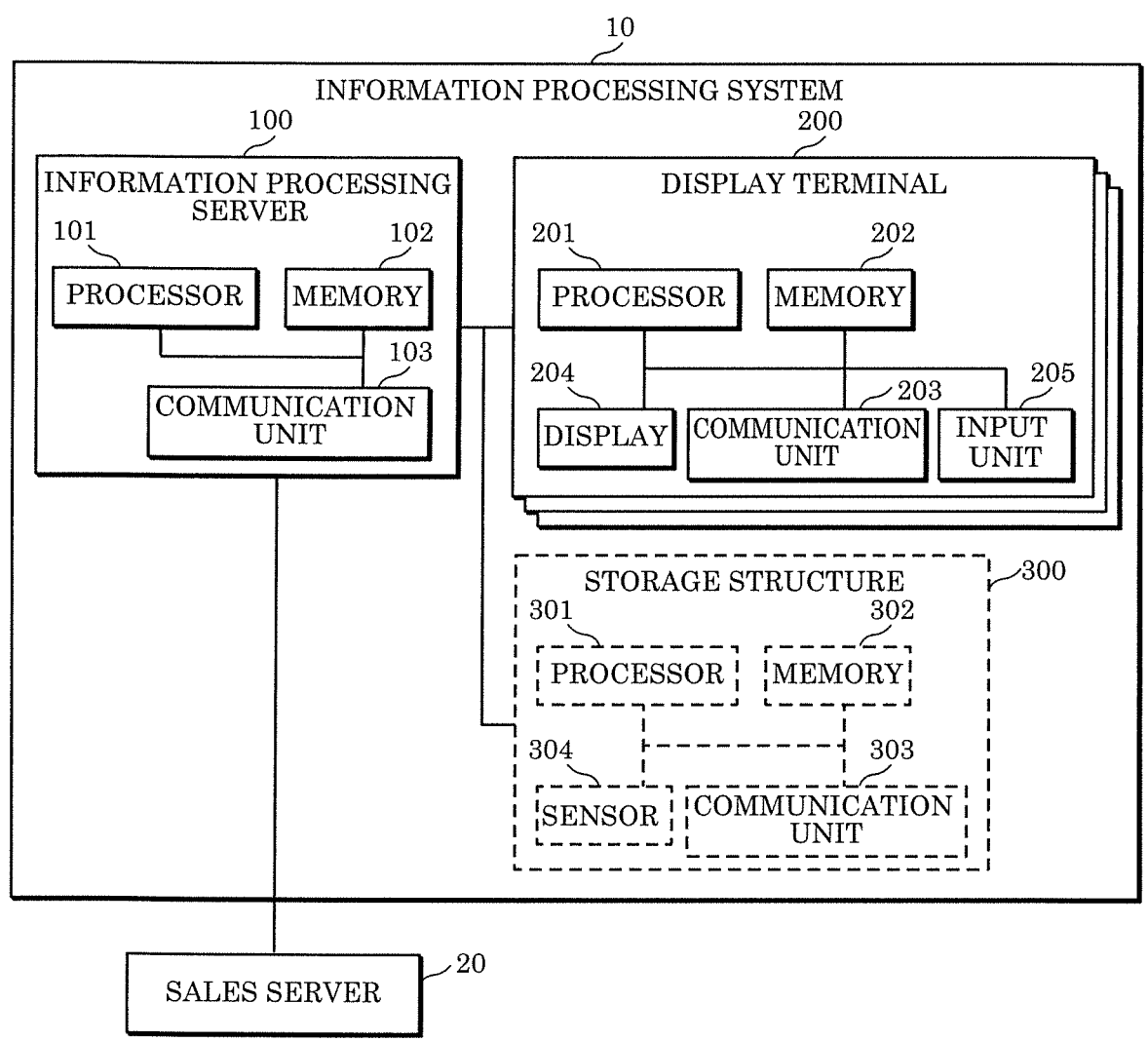
FIG. 2 is a block diagram illustrating a functional configuration of the information processing system according to Embodiment 1.

First, the configuration of an information processing system according to Embodiment 1 will be described with reference to FIG. 1 and FIG. 2. FIG. 1 is an external view illustrating the information processing system according to Embodiment 1 and a user. FIG. 2 is a block diagram illustrating the functional configuration of the information processing system according to Embodiment 1.

Information processing system 10 includes information processing server 100, one or more display terminals including display terminal 200, and storage structure 300. Information processing server 100, the one or more display terminals, and storage structure 300 are mutually communicably connected. Hereinafter, display terminal 200 will be described as a representative display terminal among the one or more display terminals, and description of the other display terminal will be omitted.

Information processing server 100 is, for example, a cloud server, and controls information that is displayed on display terminal 200 based on information received from storage structure 300.

Display terminal 200 includes a display, and displays a screen on the display based on screen information received from information processing server 100. In this embodiment, display terminal 200 is attached to a wall in a building in which storage structure 300 is provided. Alternatively, display terminal 200 may be attached to an appliance or furniture in the building.

Storage structure 300 stores one or more items. In this embodiment, storage structure 300 is exemplified as, but not limited to, a refrigerator. For example, storage structure 300 may be a pantry, and may be a shelf with no door.

An item is a material object other than real estate, and diminishes or depletes with usage. Examples of items include a foodstuff (foodstuffs include a beverage and a condiment) and consumer goods (for example, detergent, batteries, etc.).

[Configuration of Information Processing Server]

Next, the configuration of information processing server 100 will be described. As illustrated in FIG. 2, information processing server 100 includes processor 101, memory 102, and communication unit 103.

Processor 101 is electronic circuitry that is connected to memory 102. Processor 101 obtains information about an amount of an item stored in a storage structure. Processor 101 then determines whether the information about the amount of the item satisfies a first condition or not. Here, the first condition indicates that the amount of the item is less than or equal to a given amount. When the first condition is satisfied, processor 101 displays, on display 204 of display terminal 200, a screen including information about the item, information related to the amount of the item, and a suggestion to purchase a product corresponding to the item. Details regarding processes for these processes will be described later will reference to, for example, a flowchart.

Information about the item is a character, a symbol, or an image representing the item that satisfies the first condition, or any given combination thereof. The user can know what the item is via the information about the item displayed on display 204.

Information related to the amount of the item is a character, a symbol, or an image indicating that the amount of the item is less than or equal to the given amount, or any given combination thereof. The given amount need not be indicated specifically. The user can know that the inventory of the item is diminishing via the information related to the amount of the item displayed on display 204.

A purchase suggestion is information for suggesting the user to purchase a product corresponding to the item. In other words, a purchase suggestion is a character, a symbol, or an image for guiding the user to purchasing a product, or any combination thereof.

Memory 102 is, for example, semiconductor memory and/or a hard disk drive. Memory 102 can store a software program or instructions. When the software program or the instructions stored in memory 102 is executed, processor 101 can perform the above processes.

Communication unit 103 is a network adapter for performing one or both of wired and wireless communication with display terminal 200, storage structure 300, and sales server 20, via a communication network. For example, the internet, a wide area network (WAN), a local area network (LAN), or any combination thereof can be used as the communication network. A wireless LAN, Bluetooth (registered trademark), Zigbee (registered trademark), or any combination thereof can be used as the wireless communication.

[Configuration of Display Terminal]

Next, the configuration of display terminal 200 will be described. As illustrated in FIG. 2, display terminal 200 includes processor 201, memory 202, communication unit 203, display 204, and input unit 205.

Processor 201 is electronic circuitry that is connected to memory 202. Processor 201 displays a screen on display 204 based on screen information received from information processing server 100.

Memory 202 is, for example, semiconductor memory and/or a hard disk drive. Memory 202 can store a software program or instructions. When the software program or the instructions stored in memory 202 is executed, processor 201 performs various processes.

Communication unit 203 is a network adapter for performing one or both of wired and wireless communication with information processing server 100 via a communication network.

Based on the screen information received from information processing server 100, display 204 displays a screen including information about an item, information related to the amount of the item, and a suggestion to purchase a product corresponding to the item. For example, display 204 is a liquid crystal display or an organic EL display.

Input unit 205 is an input display for receiving an input from the user. For example, input unit 205 is a touch panel integrated with display 204 (i.e., is a touch screen). Moreover, for example, input unit 205 may be a mechanical button, a mouse, a keyboard, or any given combination thereof with a touch panel.

[Configuration of Storage Structure]

Next, the configuration of storage structure 300 will be described. As illustrated in FIG. 2, storage structure 300 includes processor 301, memory 302, communication unit 303, and sensor 304.

Processor 301 is electronic circuitry that is connected to memory 302. Processor 301 obtains information about the amount of an item based on the amount of the item detected by sensor 304. The information about the amount of the item is transmitted to information processing server 100 by communication unit 303.

Memory 302 is, for example, semiconductor memory and/or a hard disk drive. Memory 302 can store a software program or instructions. When the software program or the instructions stored in memory 302 is executed, processor 301 performs various processes. Moreover, memory 302 can store the information about the amount of the item obtained by sensor 304.

Communication unit 303 is a network adapter for performing one or both of wired and wireless communication with information processing server 100 via a communication network. Communication unit 303 transmits the information about the amount of the item to information processing server 100.

Sensor 304 detects the amount of an item. Here, sensor 304 is, for example, a weight sensor in the form of a sheet placed on the bottom of a door shelf. The weight sensor detects, for example, the weight of a container containing, for example, a beverage or condiment, and the weight of a foodstuff.

[Operations Performed by Information Processing System]

Figure 3:
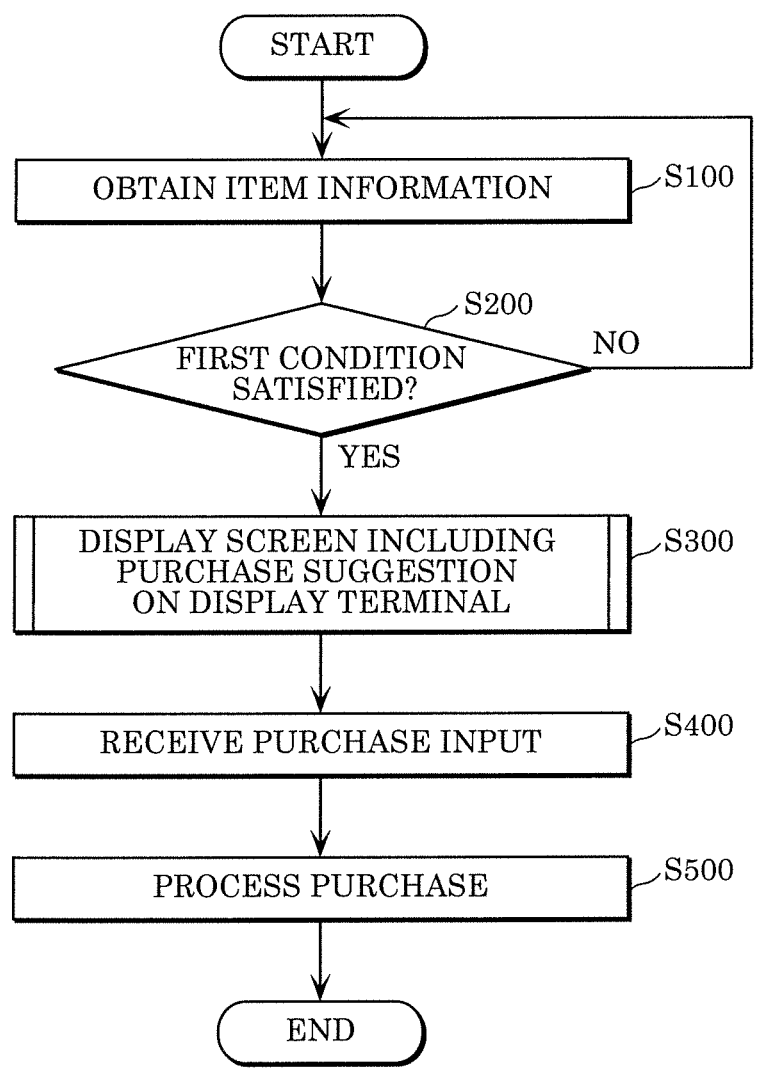
FIG. 3 is a flowchart illustrating processes performed by the information processing system according to Embodiment 1.

Next, processes performed by information processing system 10 configured as described above will be described with reference to FIG. 3 through FIG. 14. FIG. 3 is a flowchart illustrating processes performed by the information processing system according to Embodiment 1.

[Step S100]

Processor 301 in storage structure 300 obtains, via sensor 304, the information about the amount of the item stored in storage structure 300. Here, step S100 will be described with reference to FIG. 4 and FIG. 5.

Figure 4:
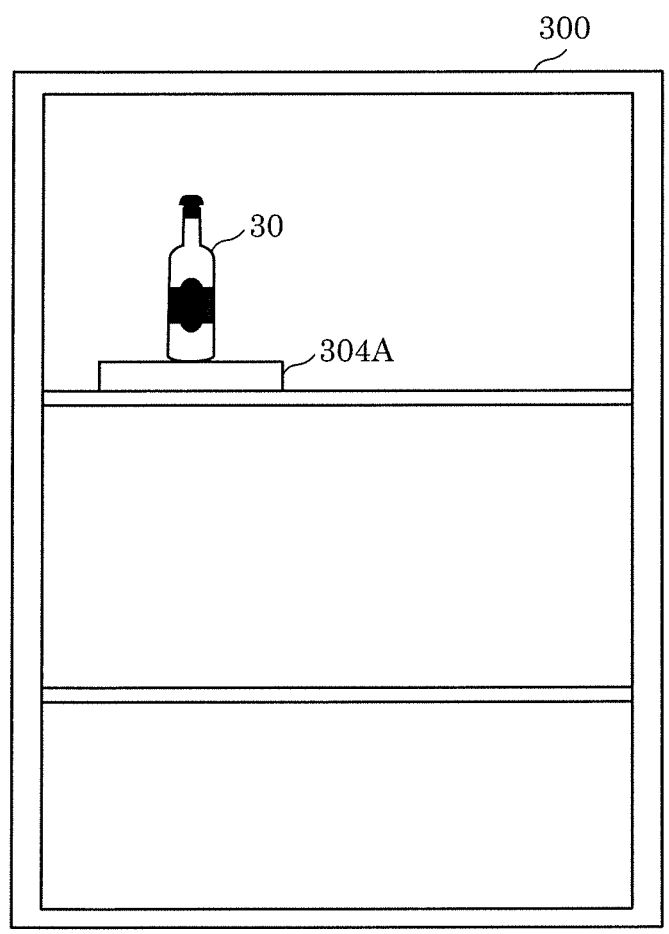
FIG. 4 is a front view of the inside of a storage structure according to Embodiment 1.

FIG. 4 is a front view of the inside of the storage structure according to Embodiment 1. FIG. 5 illustrates one example of the information about the amount of the item according to Embodiment 1.

In FIG. 4, weight sensor 304A is disposed on a shelf in storage structure 300. Weight sensor 304A is one example of sensor 304. Item 30 is disposed on weight sensor 304A. Weight sensor 304A detects the weight of item 30.

The amount of the item detected by weight sensor 304A is transmitted to information processing server 100 as the information about the amount of the item, along with the date and time and the item ID. The date and time is the date and time that the amount of the item is detected. The item ID is an identifier for identifying the item. Note that the date and time need not be transmitted.

In FIG. 5, for example, the amount of the item identified as item ID 002 obtained at 15:00:35 on 3/30/2018 is indicated as 100g. Note that the unit used for the amount of the item is not limited to a unit indicating weight (for example, grams) as illustrated in FIG. 5. For example, the unit indicating the amount of the item may be a weight percent, and may simply be a total number. In such cases, a conversion coefficient stored in advance in memory 302 is used to convert the unit indicating weight to another unit.

[Step S200]

Processor 101 in information processing server 100 determines whether the information about the amount of the item satisfies the first condition or not. Specifically, processor 101 determines whether the amount of the item is less than or equal to a given amount.

Figure 6:
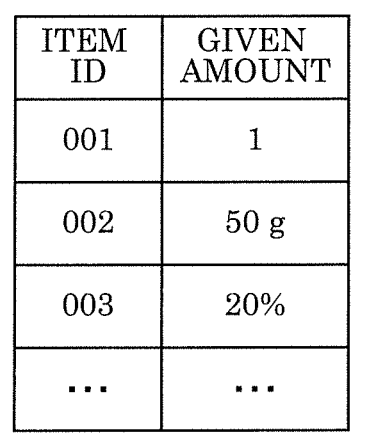

The given amount is a threshold amount determined in advance for display control purposes. FIG. 6 illustrates one example of the given amount information according to Embodiment 1. The given amount information is stored in memory 102, for example. In FIG. 6, the given amount is defined per item ID. For example, the given amount of the item identified by item ID 002 is 50 g.

When the first condition is not satisfied (No in S200), processing returns to step S100. However, when the first condition is satisfied (Yes in S200), processing proceeds to step S300.

[Step S300]

Processor 101 in information processing server 100 displays, on display 204 of display terminal 200, a screen including information about an item, information related to the amount of the item, and a purchase suggestion. In other words, processor 101 transmits, to display terminal 200 via communication unit 103, information about a screen including information about an item, information related to the amount of the item, and a purchase suggestion.

Figure 7:
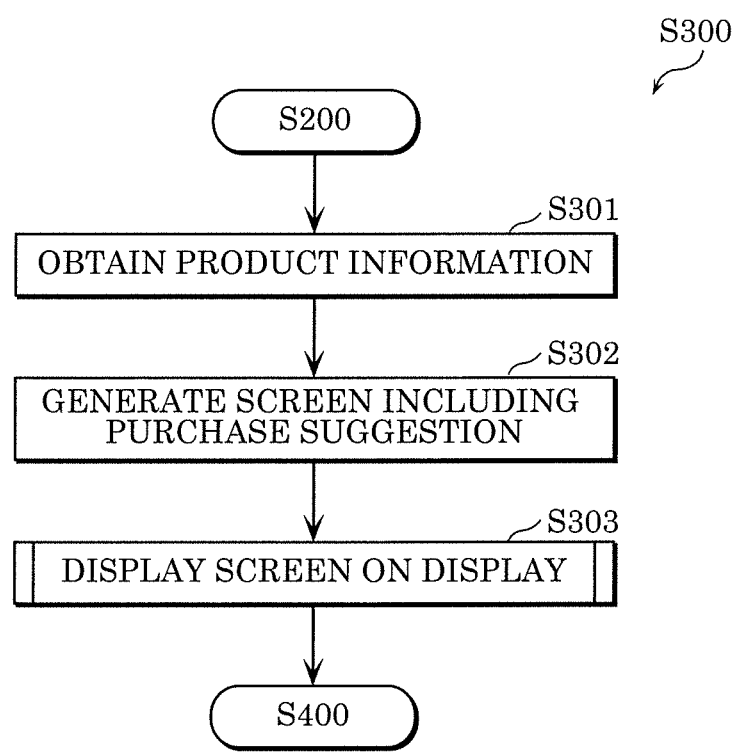
FIG. 7 is a flowchart illustrating screen processes performed by the information processing system according to Embodiment 1.

A specific example of the process of step S300 will be described with reference to FIG. 7. FIG. 7 is a flowchart illustrating screen processes performed by the information processing system according to Embodiment 1. Specifically, the flowchart in FIG. 7 illustrates the process of step S300 in FIG. 3 in detail.

[Step S301]

Processor 101 in information processing server 100 obtains product information about an item that satisfies the first condition. For example, processor 101 obtains product information from sales server 20 via communication unit 103.

A product is a commercial item. For example, there may be different products of the same item when there are different sellers or producers. The product information is information indicating the product. Specifically, the product information is the name of the product, an image of the product, description of the content of the product, the price of the product, or any combination thereof.

FIG. 8 illustrates one example of the product information according to Embodiment 1. In the product information in FIG. 8, each product ID is associated with an item ID and product information 1 through 4. Here, the product ID is an identifier for identifying the product. Product information 1 indicates the name of the product. Product information 2 indicates an image of the product. Product information 3 indicates the content of the product. Product information 4 indicates the price of the product. For example, product IDs AAA through EEE are associated with item ID 001.

[Step S302]

Based on the obtained product information, processor 101 in information processing server 100 generates a screen for the item determined to satisfy the first condition. The screen includes information about the item determined to satisfy the first condition, information related to the amount of the item, indicating that the amount of the item is less than or equal to the given amount, and a suggestion to purchase a product corresponding to the item. Communication unit 103 in information processing server 100 transmits information about the generated screen to display terminal 200.

[Step S303]

Processor 201 in display terminal 200 displays the screen on display 204 based on the information about the screen received from information processing server 100.

Figure 9:
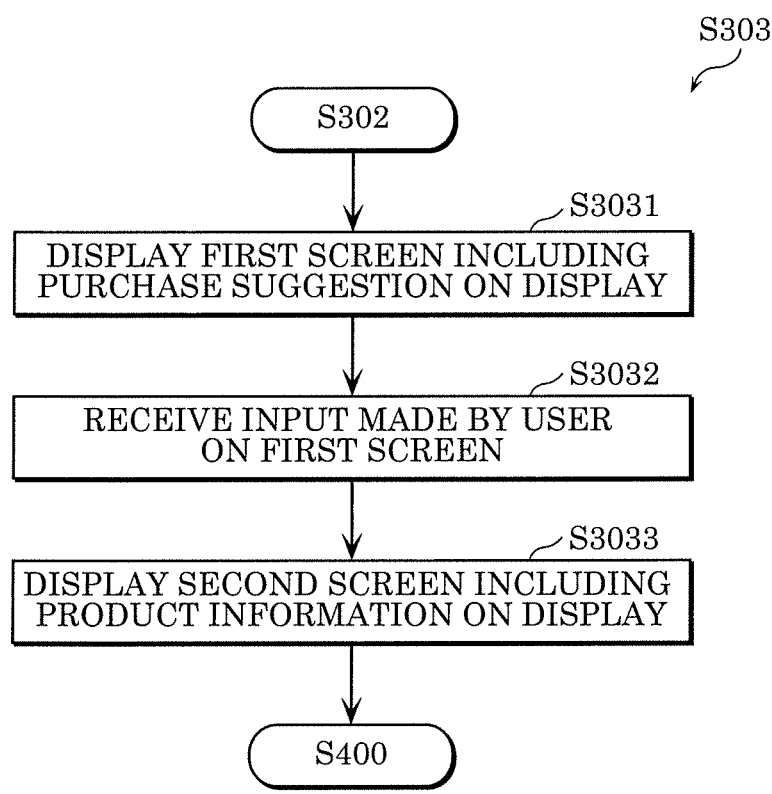
FIG. 9 is a flowchart illustrating screen display processes performed by the information processing system according to Embodiment 1.

A specific example of the process of step S303 will be described with reference to FIG. 9 through FIG. 13. FIG. 9 is a flowchart illustrating screen display processes performed by the information processing system according to Embodiment 1. Specifically, the flowchart in FIG. 9 illustrates the process of step S303 in FIG. 7 in detail.

[Step S3031]

Processor 201 in display terminal 200 displays a first screen on display 204. The first screen includes information about an item determined to satisfy the first condition, information related to the amount of the item, and a suggestion to purchase a product corresponding to the item.

Figure 10:
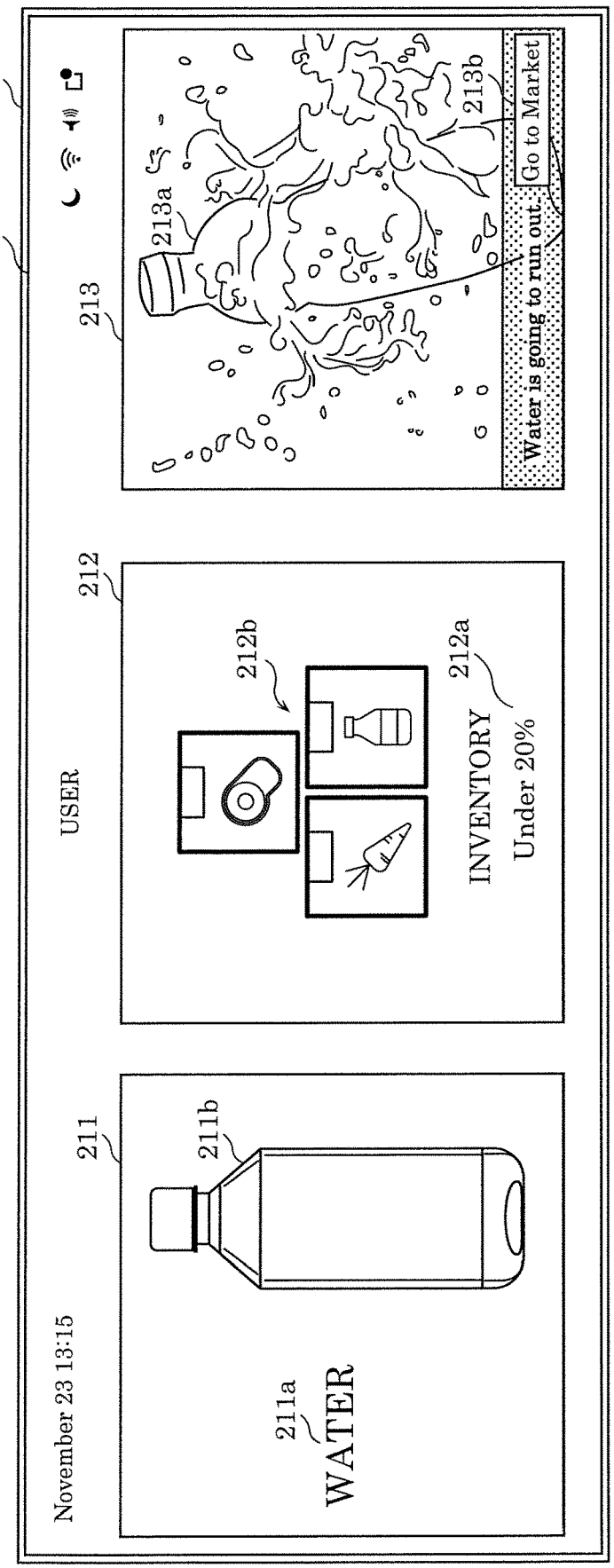
FIG. 10 illustrates one example of a first state of a first screen according to Embodiment 1.

FIG. 10 illustrates one example of a first state of the first screen according to Embodiment 1. Information 211 about an item, information 212 related to the amount of the item, and purchase suggestion 213 are displayed on display 204 of display terminal 200 in order from left to right on the screen. Specifically, information 211 about the item, information 212 related to the amount of the item, and purchase suggestion 213 are respectively displayed in three display regions aligned horizontally.

Here, the three display regions are of the same shape and size. Each of the three display regions is a square region that occupies approximately one third of the display region of display 204. Note that "the same" includes "precisely the same" and "essentially the same". In other words, "the same" means "approximately the same". Moreover, a "square" shape includes a precisely square shape and shapes within a range that would be recognized as being essentially the same as a precise square shape.

Information 211 about the item, information 212 related to the amount of the item, and purchase suggestion 213 may be concurrently displayed on display 204, for example. In other words, the display of the three items of information may start concurrently. Moreover, for example, after information 211 about the item and information 212 related to the amount of the item are displayed, purchase suggestion 213 may be displayed along with information 211 about the item and information 212 related to the amount of the item.

In FIG. 10, information 211 about the item includes characters 211a and image 211b which indicate the item. Information 212 related to the amount of the item includes characters 212a indicating that the amount of the item is less than or equal to a given amount (20% in this example), and image 212b related to inventory. Purchase suggestion 213 includes image 213a of a product corresponding to the item, and characters 213b indicating transition to a screen for purchasing the product.

The reason for information 211 about the item, information 212 related to the amount of the item, and purchase suggestion 213 being included in the first screen will be described. The first screen includes information 211 about the item so that the user can know what product included in storage structure 300 the information indicates when a plurality of items are stored in storage structure 300. The first screen includes information 212 related to the amount of the item in order to indicate the state of the item indicated by information 211 about the item. With this, the user can know the items that are in storage structure 300 and the amount of the items, by checking information 211 about the item and information 212 related to the amount of the item included in first screen.

The first screen includes purchase suggestion 213 in order to prompt the user to perform a subsequent action, in accordance with information 211 about the item and information 212 related to the amount of the item. The subsequent action by the user based on information 212 related to the amount of the item is highly likely to be an act of purchasing the item, which is why purchase suggestion 213 is displayed. In other words, the first screen includes purchase suggestion 213 based on the assumption that the next action by the user which corresponds to a change in amount of the item is the purchasing of the item.

In other words, the first screen includes information 211 about the item and information 212 related to the amount of the item so that information related to a plurality of items stored in storage structure 300 can be easily checked. Furthermore, the first screen includes purchase suggestion 213 as the subsequent action by the user based on information 211 about the item and information 212 related to the amount of the item. Information 211 about an item represents which item in the storage structure is indicated, information 212 related to the amount of an item indicates a state related to the item, and purchase suggestion 213 hypothesizes the subsequent action that will performed by the user corresponding to a change in the amount of the item. The user can check what the item is, the state of the item, and the subsequent action and perform the next action all at once, by looking at the first screen. For example, the first screen may include, as information related to the item, only information 211 about an item, information 212 related to the amount of the item, and purchase suggestion 213.

[Step S3032]

Input unit 205 in display terminal 200 receives an input made by the user on the first screen displayed on display 204. For example, input unit 205 receives an input of a touch gesture made by the user on display 204.

Figure 11:
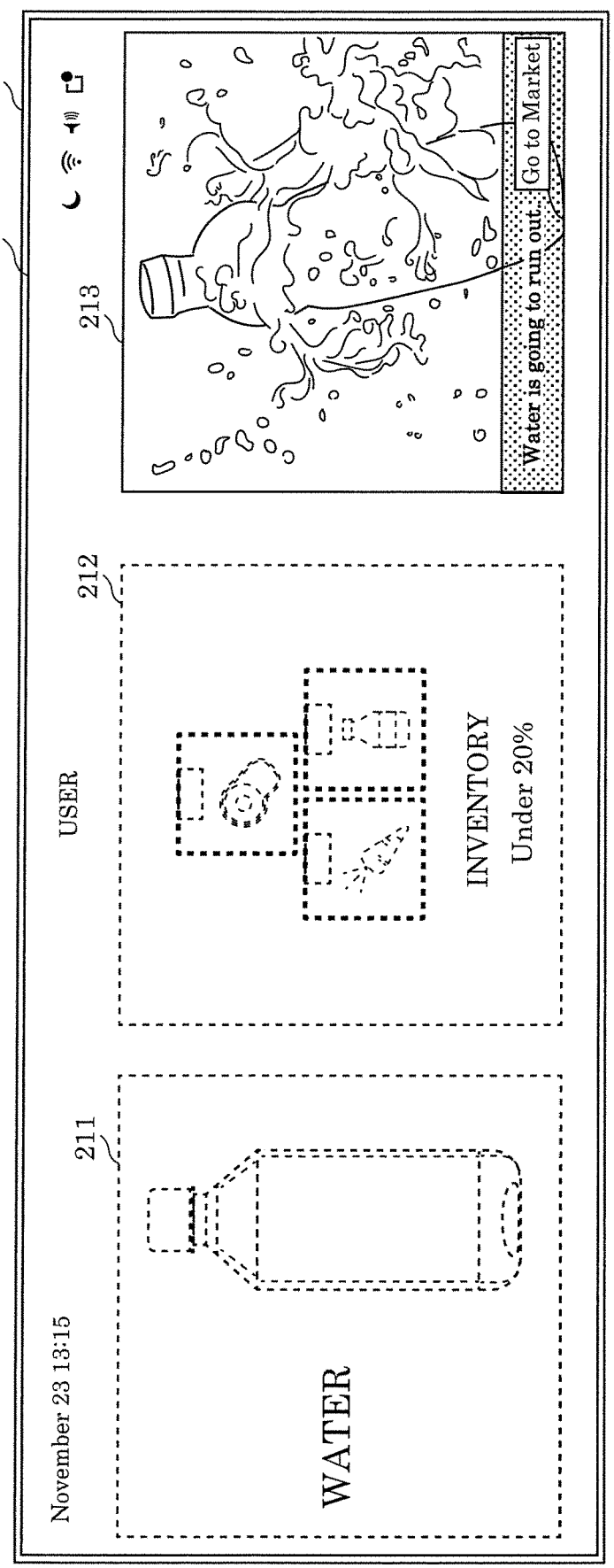
FIG. 11 illustrates one example of a second state of the first screen according to Embodiment 1.

FIG. 11 illustrates one example of a second state of the first screen according to Embodiment 1. When an input of a touch gesture made by the user on purchase suggestion 213 in the first state illustrated in FIG. 10 is received, the first screen transitions to the second state illustrated in FIG. 11. In the second state, information 211 about the item and information 212 related to the amount of the item are grayed out. In other words, focus is placed on purchase suggestion 213. In this way, in a state in which purchase suggestion 213 is focused on, input unit 205 further receives an input of a touch gesture made by the user on purchase suggestion 213.

[Step S3033]

Processor 201 in display terminal 200 displays, on display 204, a second screen including product information. The second screen is a screen for ordering a product.

Figure 12:
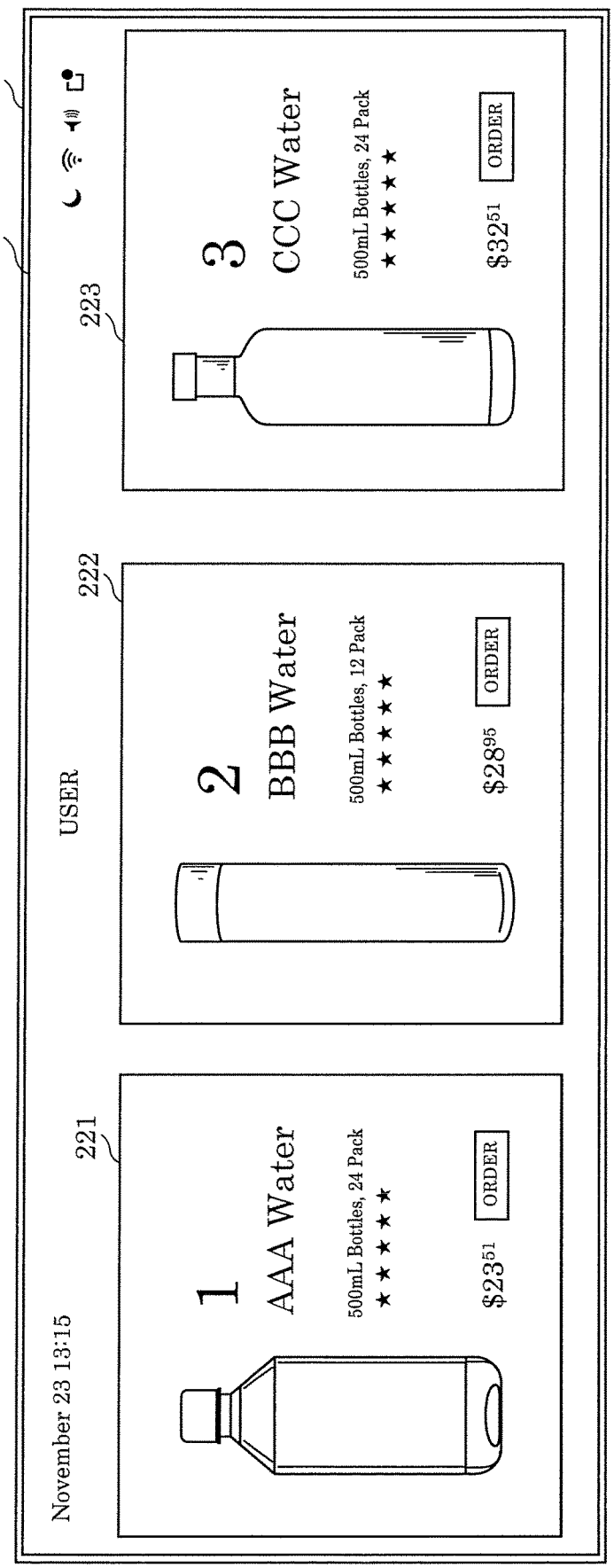
FIG. 12 illustrates one example of a first state of a second screen according to Embodiment 1.
Figure 13:
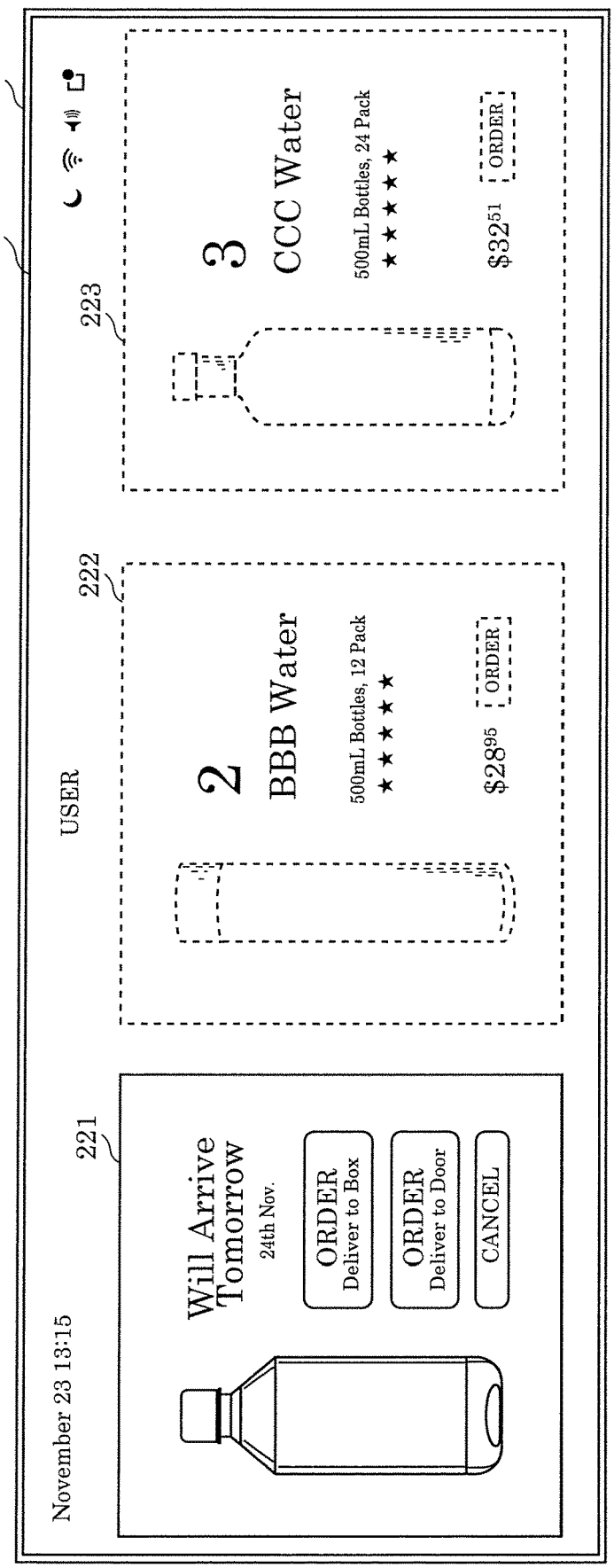
FIG. 13 illustrates one example of a second state of the second screen according to Embodiment 1.

FIG. 12 illustrates one example of a first state of the second screen according to Embodiment 1. FIG. 13 illustrates one example of a second state of the second screen according to Embodiment 1. The second screen transitions from the first state illustrated in FIG. 12 to the second state illustrated in FIG. 13 based on an input made by the user.

In FIG. 12, display 204 of display terminal 200 displays a plurality of items of product information corresponding to an item that satisfies the first condition. Specifically, first product information 221, second product information 222, and third product information 223 are displayed in order from left to right on the screen. In this example, first product information 221, second product information 222, and third product information 223 indicate mutually different products corresponding to water, which is the item.

Each of first product information 221, second product information 222, and third product information 223 includes an image of the product and characters and symbols indicating the name, content, rating, and price of the product. For example, when an input of a touch gesture is made by the user on first product information 221, the content of first product information 221 changes and second product information 222 and third product information 223 become grayed out, as illustrated in FIG. 13.

In FIG. 13, first product information 221 includes the expected delivery date, two order buttons for two different delivery locations, and a cancel button. The user can confirm or cancel the ordering of the product by touching the buttons.

[Step S400]

Input unit 205 in display terminal 200 receives an input of a purchase made by the user on the screen displayed on display 204. For example, input unit 205 receives, as an input of a purchase, an input of a touch gesture made by the user on an order button in FIG. 13.

[Step S500]

Processor 201 in display terminal 200 performs a purchase process. For example, processor 201 in display terminal 200 transmits order information to information processing server 100 via communication unit 203. Information processing server 100 then orders the product by transmitting the order information to sales server 20.

[Flow of Information Between Apparatuses]

Figure 14:
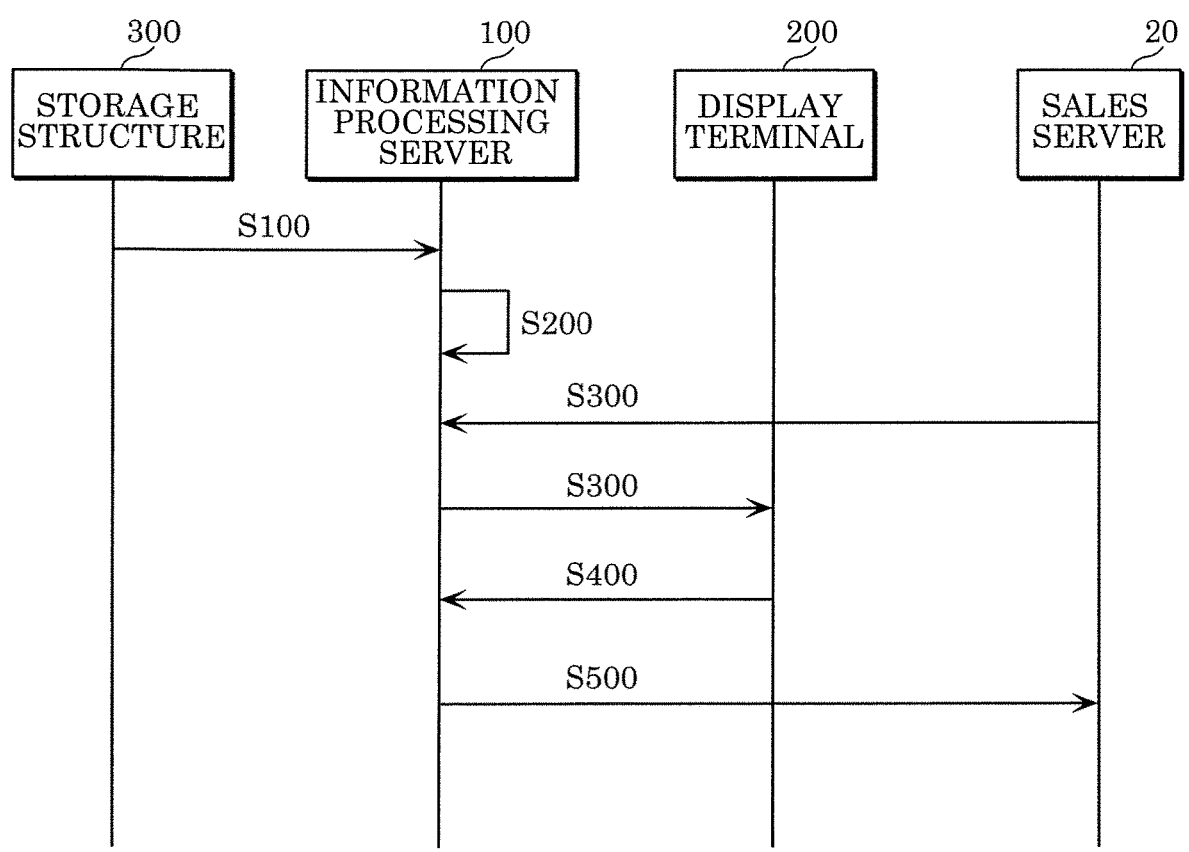
FIG. 14 is a sequence diagram for the information processing system according to Embodiment 1.

Here, the flow of information in information processing system 10 and the flow of information between information processing system 10 and sales server 20 will be described with reference to FIG. 14. FIG. 14 is a sequence diagram for the information processing system according to Embodiment 1. The reference signs (S100 through S500) in FIG. 14 correspond to the reference signs in FIG. 3.

Storage structure 300 obtains, and transmits to information processing server 100, information about the amount of an item (S100). Information processing server 100 determines whether the information about the amount of the item satisfies the first condition or not (S200). When the information about the amount of the item satisfies the first condition, information processing server 100 receives product information corresponding to the item from sales server 20, and transmits, to display terminal 200, information about a screen including a suggestion to purchase a product (S300). Display terminal 200 displays a screen based on the information about the screen received from information processing server 100, receives an input of a purchase from the user, and transmits order information to information processing server 100 (S400). Information processing server 100 transmits the order information to sales server 20 (S500).

[Advantageous Effects, Etc.]

As described above, with information processing system 10 according to the present embodiment, when the first condition is satisfied, it is possible to cause display 204 to display a screen including information about an item, information related to the amount of the item, indicating that the amount of the item is less than or equal to a given amount, and a suggestion to purchase a product corresponding to the item. This makes it possible to smoothly purchase a product after checking how much of which item has diminished. In other words, information processing system 10 can effectively provide the user with information for suggesting the purchase of a product.

Moreover, with information processing system 10 according to the present embodiment, it is possible to display, in order from left to right of the screen, information about the item, information related to the amount of the item, and a purchase suggestion. With this, the user can easily know how much of which item has diminished, by looking at the screen from left to right. Accordingly, information processing system 10 can improve the visibility of the screen.

Hereinafter, variations of Embodiment 1 will be described in order.

Variation 1 of Embodiment 1

First, Variation 1 of Embodiment 1 will be described. This variation differs from Embodiment 1 described above in regard to the sensor that obtains the amount of an item stored in the storage structure. Hereinafter, the present variation will be specifically described with reference to the drawings, focusing on the points of difference with Embodiment 1 described above.

[Configuration of Storage Structure]

Figure 15:
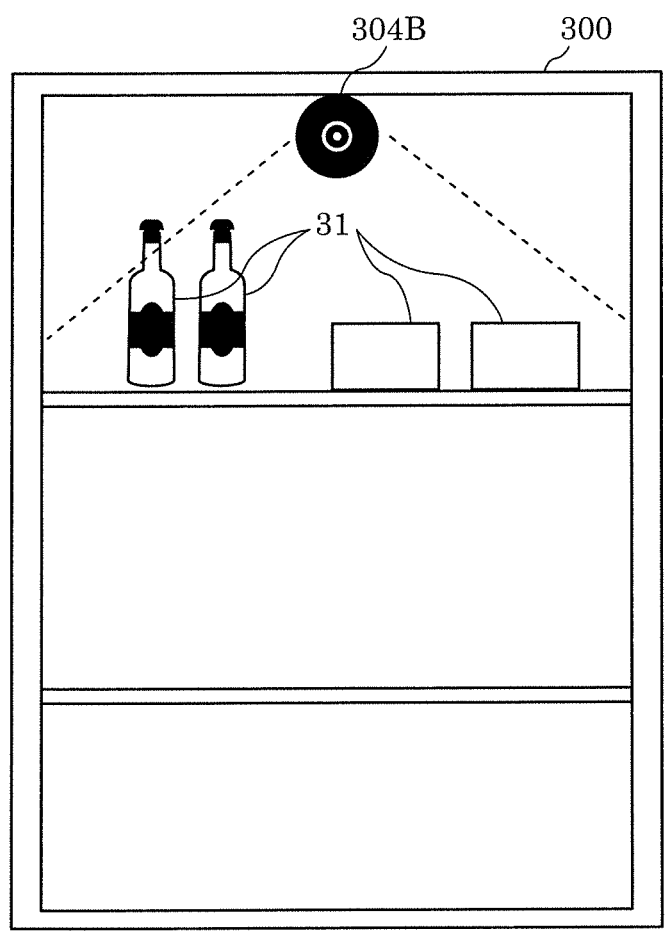
FIG. 15 is a front view of the inside of a storage structure according to Variation 1 of Embodiment 1.

FIG. 15 is a front view of the inside of the storage structure according to Variation 1 of Embodiment 1.

Storage structure 300 according to this variation includes a camera that includes sensor 304. Sensor 304 is image sensor 304B, and captures an image of items 31 stored in storage structure 300. For example, image sensor 304B captures the inside of storage structure 300 when a door of storage structure 300 is opened. Processor 301 then obtains the amount of each item based on the image of items 31 captured by image sensor 304B. Specifically, processor 301 obtains information about amounts of items 31 through recognition of items 31 in the image, for example.

Moreover, for example, processor 301 may detect, from a plurality of pictures captured at different times, that an item 31 has been placed back in storage structure 300 after being taken out of storage structure 300, and thereupon obtain information about the amount of the item by subtracting a given amount from the amount of the item 31. In such cases, memory 302 may store given amount information indicating a given amount for each item.

FIG. 16 illustrates given amount information according to Variation 1 of Embodiment 1. Given amount information indicates item ID, usage amount per use, and whether the item is a returnable item or not. Here, usage amount per use corresponds to the given amount. Moreover, whether the item is a returnable item or not indicates whether the item is an item that is placed back in storage structure 300 after use or not. For example, a beverage bottle is defined as "YES" since a beverage bottle is placed back in storage structure 300 after use, and an egg is defined as "NO" since an egg is a one-time use item that not placed back in storage structure 300 after use.

In FIG. 16, for example, the item identified by the item ID of 002 has a usage amount per use of 20g, and is placed back in storage structure 300 after use. Accordingly, when the item identified by the item ID of 002 is detected as being returned to storage structure 300, the amount of that item is reduced by 20g.

Figure 17:
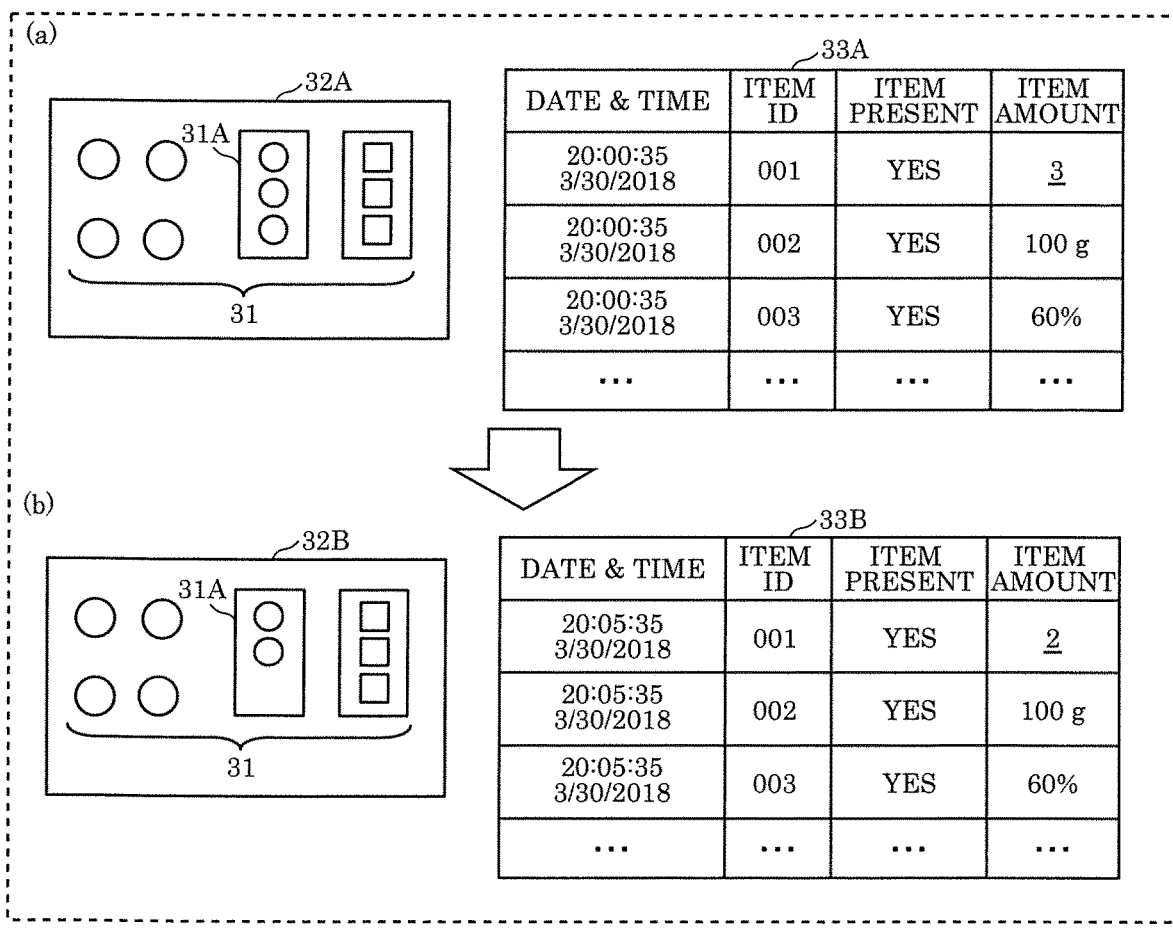
FIG. 17 illustrates a specific example of the obtaining of information about the amount of an item according to Variation 1 of Embodiment 1.
Figure 18:
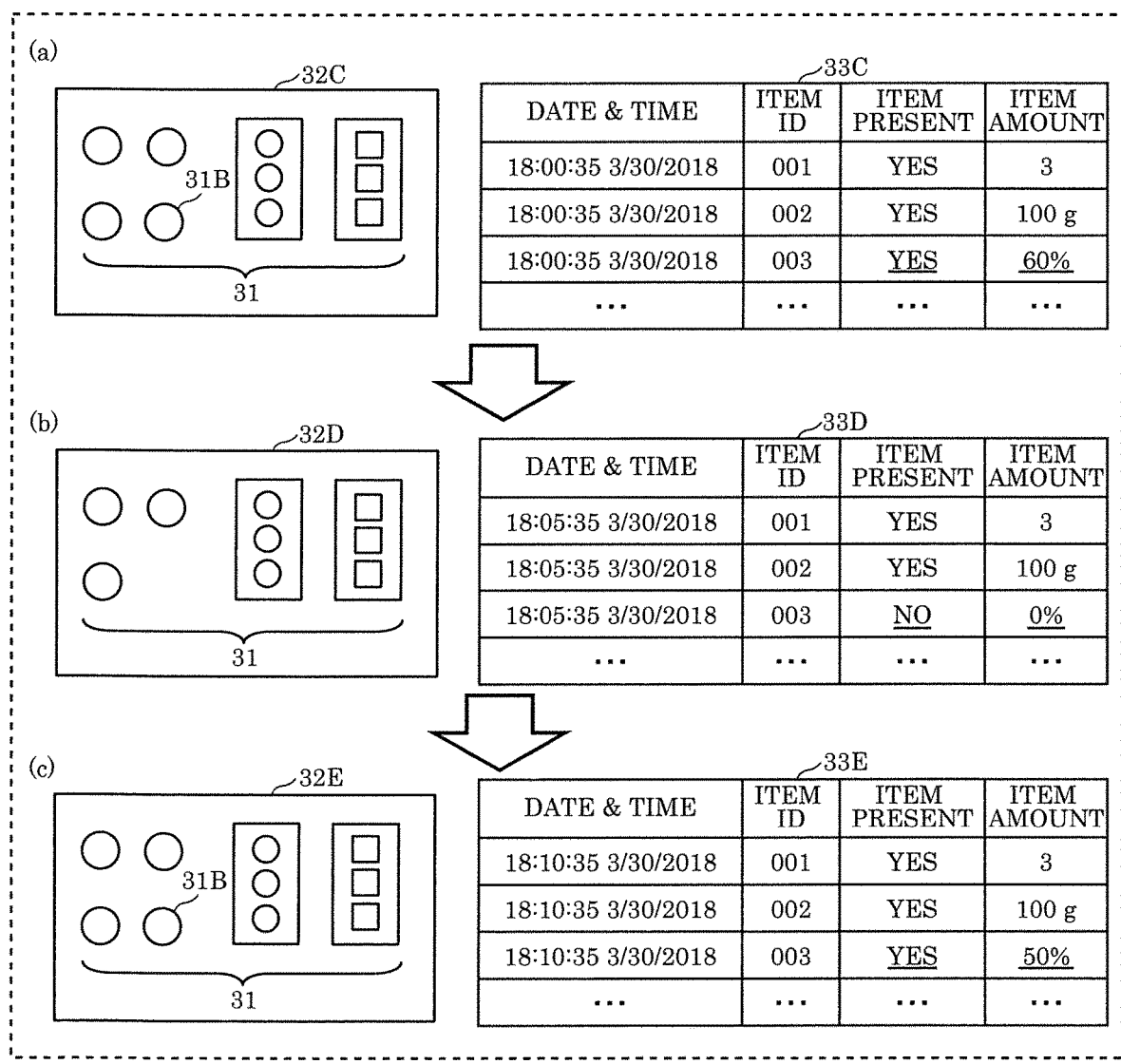
FIG. 18 illustrates a specific example of the obtaining of information about the amount of an item according to Variation 1 of Embodiment 1.

A specific example of the method of obtaining the amount of an item from an image captured by sensor 304 will be described with reference to FIG. 17 and FIG. 18. FIG. 17 and FIG. 18 each illustrate a specific example of the obtaining of information about the amount of an item according to Variation 1 of Embodiment 1.

FIG. 17 describes the obtaining of information about the amount of the item identified by the item ID of 001 and defined as "NO" in regard to whether it is an item that is returned or not. In (a) in FIG. 17, first image 32A and first information 33A about amounts of items at a first time and date (20:00:35 3/30/2018) are shown. In (b) in FIG. 17, second image 32B and second information 33B about amounts of items at a second time and date (20:05:35 3/30/2018) after the first time and date are shown.

Item 31A in first image 32A and second image 32B is recognized as having the item ID of 001. By analyzing first image 32A, processor 301 can derive that the amount of item 31A is three. By analyzing second image 32B, processor 301 can derive that the amount of item 31A is two. As a result, in second information 33B about amounts of items, the amount of the item identified as item ID 001 is updated from three to two.

FIG. 18 describes the obtaining of information about the amount of the item identified by the item ID of 003 and defined as "YES" in regard to whether it is an item that is returned or not. In (a) in FIG. 18, first image 32C and first information 33C about amounts of items at a first time and date (18:00:35 3/30/2018) are shown. In (b) in FIG. 18, second image 32D and second information 33D about amounts of items at a second time and date (18:05:35 3/30/2018) after the first time and date are shown. In (c) in FIG. 18, third image 32E and third information 33E about amounts of items at a third time and date (18:10:35 3/30/2018) after the second time and date are shown.

Item 31B in first image 32C, second image 32D, and third image 32E is recognized as having the item ID of 003. First information 33C about amounts of items, indicating that the amount of item 31B is 60%, has already been obtained. Here, if second image 32D is captured, sensor 304 analyzes second image 32D and recognizes that item 31B is not inside storage structure 300. Sensor 304 then updates second information 33D about amounts of items to reflect that the item whose item ID is 003 is not present and has an amount of 0%. Thereafter, if third image 32E is captured, sensor 304 analyzes third image 32E and recognizes that item 31B has been placed back in storage structure 300. Sensor 304 then updates third information 33E about amounts of items to reflect that the item whose item ID is 003 is present and has an amount of 50%. The item amount of 50% is a result of reducing the item amount of 60% in first information 33C about amounts of items by the usage amount per use in FIG. 16 of 10%.

[Advantageous Effects, Etc.]

As described above, with the present variation, it is possible to detect items stored in storage structure 300 and the amounts of the items by using an image sensor. Moreover, even when it is difficult to detect the amount of an item from an image, it is possible to estimate the amount of the item based on a usage amount per use, by detecting the item being placed back in storage structure 300.

Variation 2 of Embodiment 1

Next, Variation 2 of Embodiment 1 will be described. This variation differs from Embodiment 1 described above in regard to the configuration of the screen including information about an item, information related to the amount of the item, and a suggestion to purchase a product corresponding to the item. Hereinafter, the present variation will be specifically described with reference to the drawings, focusing on the points of difference with Embodiment 1 described above.

Figure 19:
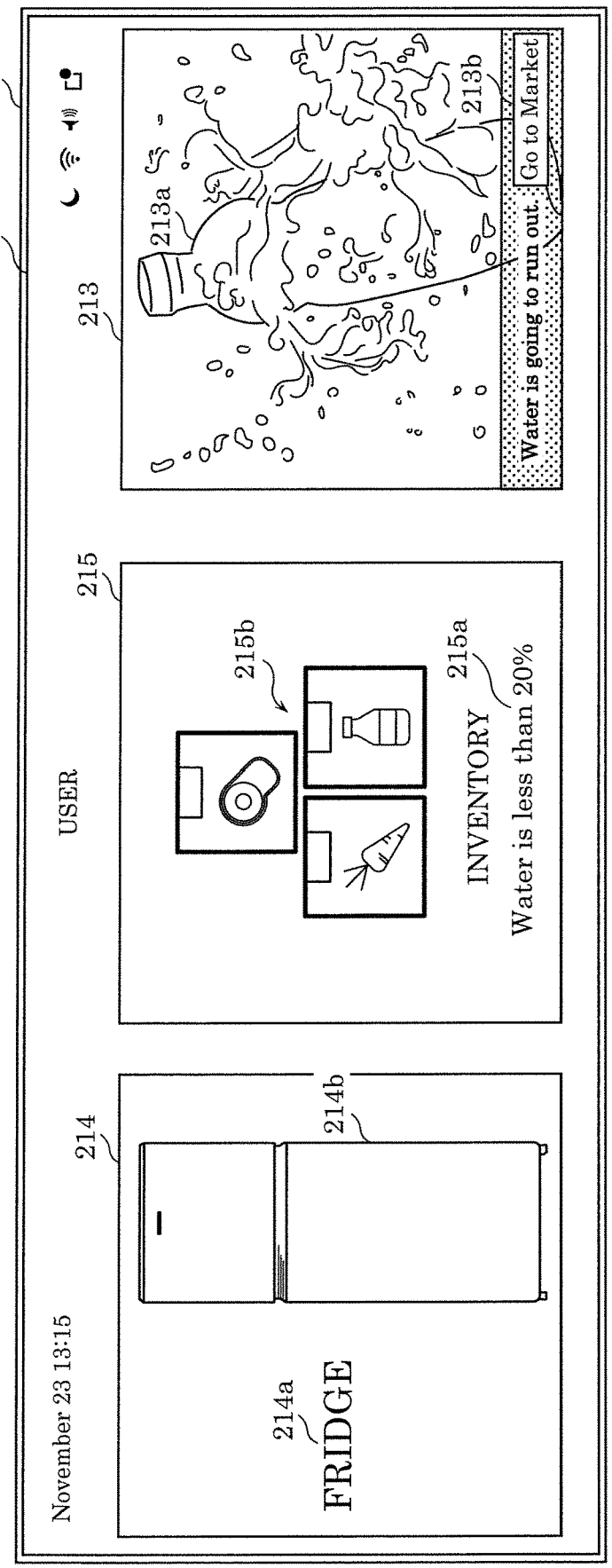
FIG. 19 illustrates one example of a first screen according to Variation 2 of Embodiment 1.

FIG. 19 illustrates one example of the first screen according to Variation 2 of Embodiment 1. In FIG. 19, storage structure information 214, information 215 related to items and the amount of an item, and purchase suggestion 213 are displayed in order on display 204 of display terminal 200.

Storage structure information 214 includes characters 214a and image 214b that indicate the storage structure. Information 215 related to items and the amount of an item includes characters 215a indicating that the amount of an item (water in this example) is less than or equal to a given amount (20% in this example), and image 215b related to inventory. Purchase suggestion 213 is the same as described in Embodiment 1. Accordingly, repeated description is omitted.

In this way, with this variation, it is possible to display storage structure information, which allows the user to visually recognize what items are diminishing in the storage structure.

Variation 3 of Embodiment 1

Next, Variation 3 of Embodiment 1 will be described. This variation differs from Embodiment 1 described above in regard to the transition of screens when the screen including information about an item, information related to the amount of the item, and a suggestion to purchase a product corresponding to the item is displayed. Hereinafter, the present variation will be specifically described with reference to the drawings, focusing on the points of difference with Embodiment 1 described above.

Figure 20:
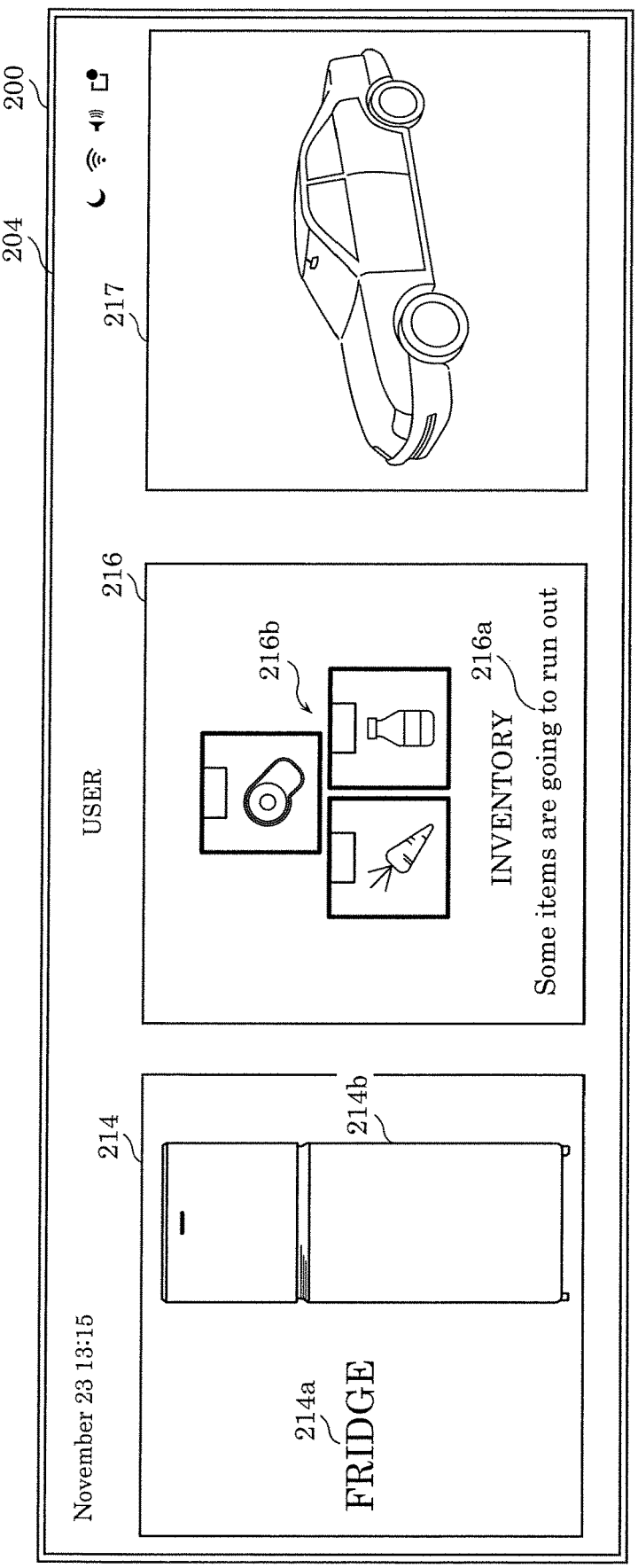
FIG. 20 illustrates one example of a screen displayed before a first screen according to Variation 3 of Embodiment 1.

FIG. 20 illustrates one example of a screen displayed before the first screen according to Variation 3 of Embodiment 1. On this screen, storage structure information 214, information 216 related to the amount of an item, and arbitrary image 217 are displayed in order.

Storage structure information 214 is the same as described in Variation 2. Accordingly, repeated description is omitted. Information 216 related to the amount of an item includes characters 216a indicating that the amount of some item is less than or equal to a given amount, and image 216b related to inventory. Arbitrary image 217 is, for example, an image for use as a screen saver and/or an image that the user likes.

When an input made by the user on the screen illustrated in FIG. 20 is received, the first screen including a purchase suggestion (for example, see FIG. 10 or FIG. 19) is displayed.

Variation 4 of Embodiment 1

Next, Variation 4 of Embodiment 1 will be described. This variation differs from Embodiment 1 described above in that the display terminal performs the processing performed by the information processing server in Embodiment 1. Hereinafter, the present variation will be specifically described with reference to the drawings, focusing on the points of difference with Embodiment 1 described above.

Figure 21:
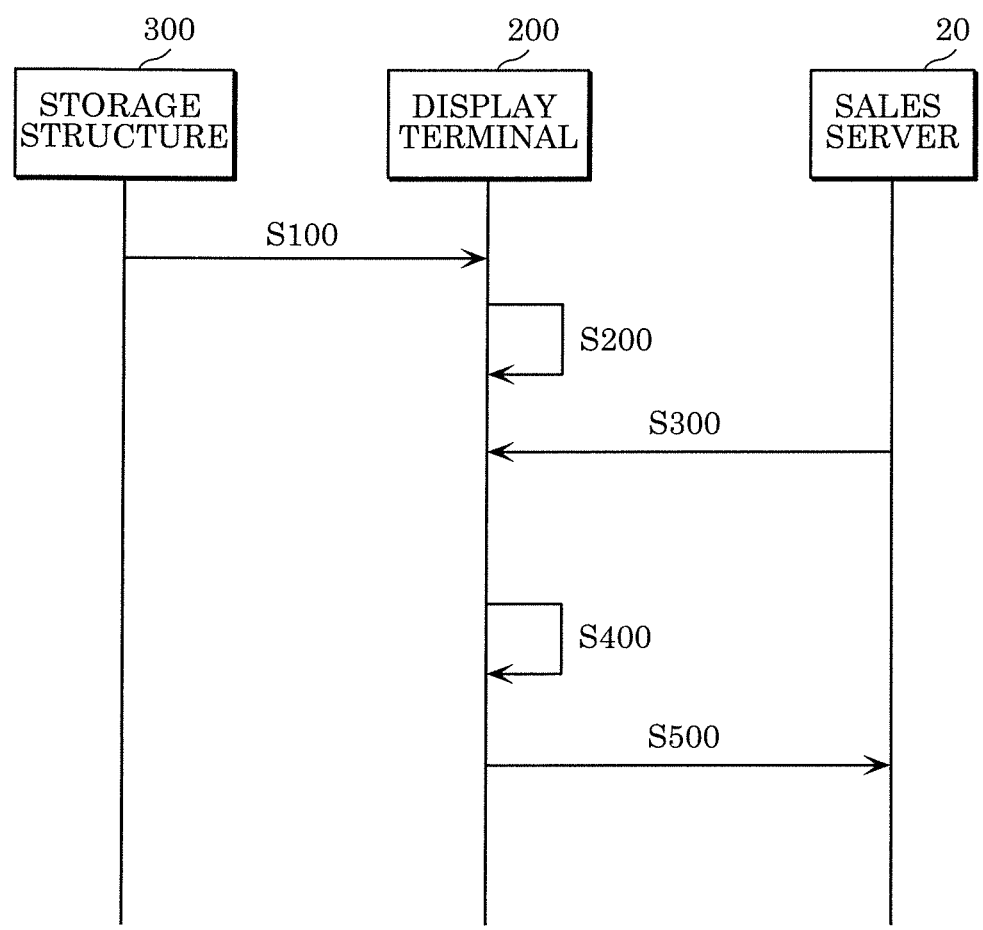
FIG. 21 is a sequence diagram for an information processing system according to Variation 4 of Embodiment 1.

FIG. 21 is a sequence diagram for the information processing system according to Variation 4 of Embodiment 1. The reference signs (S100 through S500) in FIG. 21 correspond to the reference signs in FIG. 3.

In FIG. 21, storage structure 300 obtains, and transmits to display terminal 200, information about the amount of an item (S100). Display terminal 200 determines whether the information about the amount of the item satisfies the first condition or not (S200). When the information about the amount of the item satisfies the first condition, display terminal 200 receives product information corresponding to the item from sales server 20, and transmits, to display terminal 200, information about a screen including a suggestion to purchase a product (S300). Display terminal 200 displays a screen based on the information about the screen received from display terminal 200, receives an input of a purchase from the user, and generates order information (S400). Display terminal 200 transmits the order information to sales server 20 (S500).

In this way, with this variation, it is possible for the display terminal 200 to perform the processes of information processing server 100. Accordingly, information processing system 10 according to this variation need not include information processing server 100. Even in such cases, the same advantageous effects as Embodiment 1 described above can be achieved.

Variation 5 of Embodiment 1

Next, Variation 5 of Embodiment 1 will be described. This variation differs from Embodiment 1 described above in that the display terminal performs some of the processing performed by the information processing server. Hereinafter, the present variation will be specifically described with reference to the drawings, focusing on the points of difference with Embodiment 1 described above.

Figure 22:
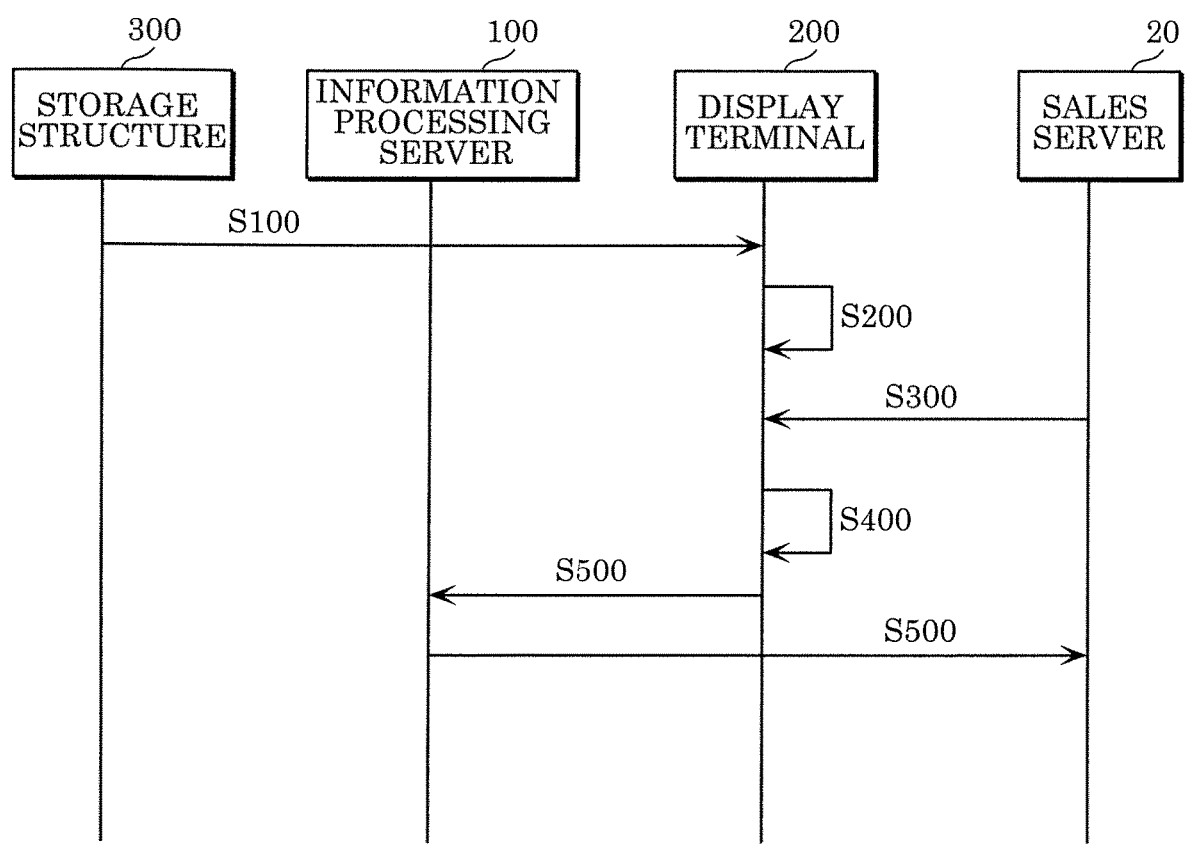
FIG. 22 is a sequence diagram for an information processing system according to Variation 5 of Embodiment 1.

FIG. 22 is a sequence diagram for the information processing system according to Variation 5 of Embodiment 1. The reference signs (S100 through S500) in FIG. 22 correspond to the reference signs in FIG. 3.

In FIG. 22, storage structure 300 obtains, and transmits to display terminal 200, information about the amount of an item (S100). Display terminal 200 determines whether the information about the amount of the item satisfies the first condition or not (S200). When the information about the amount of the item satisfies the first condition, display terminal 200 receives product information corresponding to the item from sales server 20, and transmits, to display terminal 200, information about a screen including a suggestion to purchase a product (S300). Display terminal 200 displays a screen based on the information about the screen received from display terminal 200, receives an input of a purchase from the user, and generates order information (S400). Display terminal 200 transmits the order information to sales server 20 via information processing server 100 (S500).

In this way, with this variation, it is possible for the display terminal 200 to perform part of the processes of information processing server 100. Even in such cases, the same advantageous effects as Embodiment 1 described above can be achieved.

Embodiment 2

Next, Embodiment 2 will be described. This embodiment differs from Embodiment 1 described above in that when the amount of an item stored in the storage structure becomes less than or equal to a given amount, the purchase suggestion is displayed depending on the order fulfillment status of the item. Hereinafter, the present embodiment will be specifically described with reference to the drawings, focusing on the points of difference with Embodiment 1 described above.

Note that since the configuration of information processing system 10 according to the present embodiment is essentially the same as Embodiment 1, repeated description and depiction in the drawings are omitted.

[Operations Performed by Information Processing System]

Figure 23:
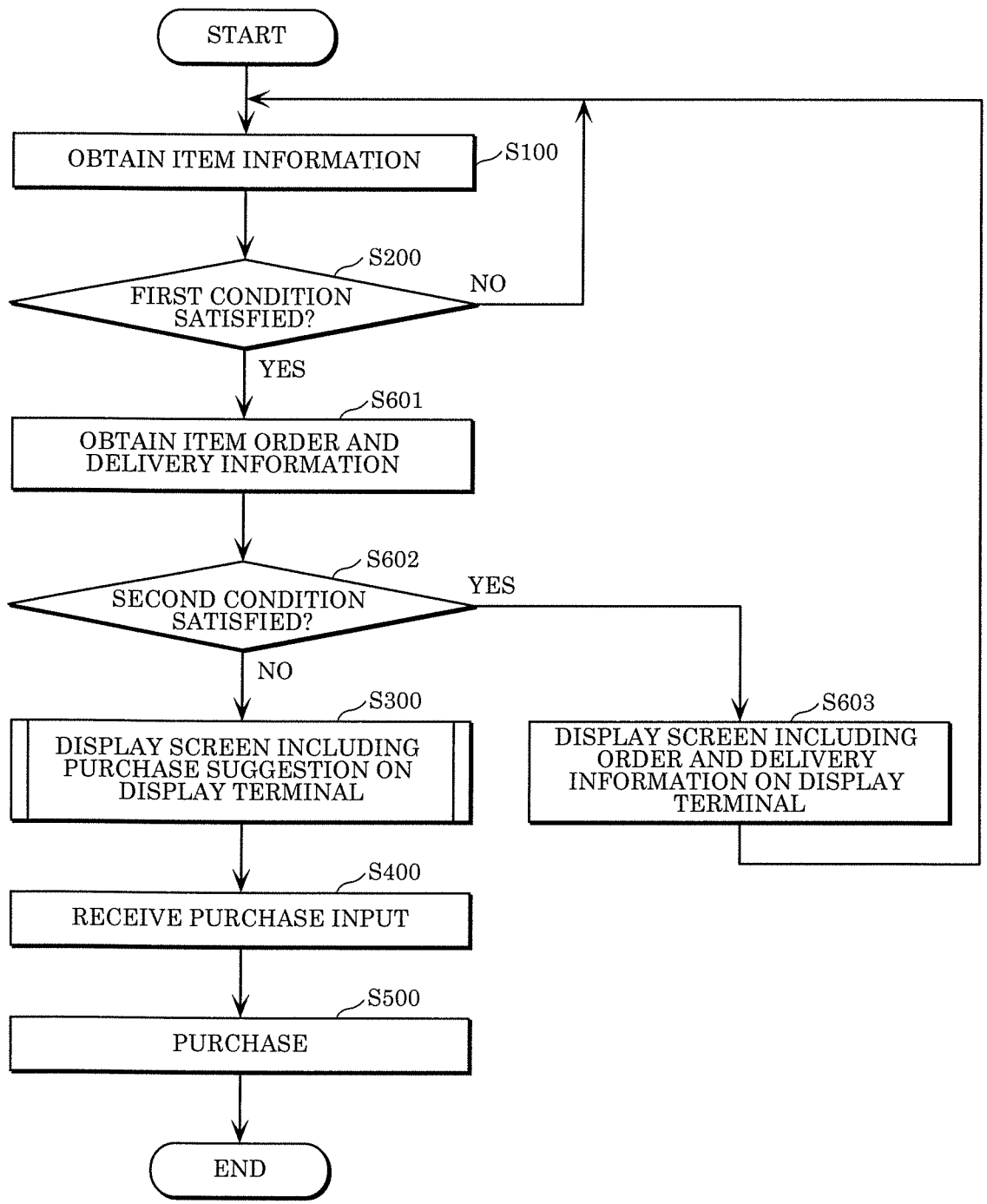
FIG. 23 is a flowchart illustrating processes performed by an information processing system according to Embodiment 2.

FIG. 23 is a flowchart illustrating processes performed by the information processing system according to Embodiment 2.

[Step S601]

After step S100 and step S200 are performed, when the first condition is satisfied, processor 101 in information processing server 100 obtains information about the order and delivery of an item that satisfies the first condition. For example, processor 101 obtains user order and delivery information from sales server 20. Moreover, for example, processor 101 may separately obtain order information from sales server 20 and delivery information from a shipping management server (not illustrated in the drawings).

FIG. 24 illustrates one example of order and delivery information according to Embodiment 2. In FIG. 24, the order and delivery information indicates the order date and time, the ordered item ID, and the delivery status. The order date and time indicates the date and time that the item was ordered. The ordered item ID is the identifier of the ordered item. The delivery status indicates whether or not the ordered item has been delivered. "Delivered" indicates that the ordered item has already been delivered to the user. Conversely, "undelivered" indicates that the ordered item has not been delivered to the user.

[Step S602]

Processor 101 in information processing server 100 determines whether the order and delivery information satisfies a second condition or not. The second condition indicates that the item has been ordered and the item has not been delivered. In other words, processor 101 determines whether an order of the item that satisfies the first condition is unfulfilled or not. Note that the second condition according to the present embodiment may also be referred to as a third condition.

FIG. 25 illustrates the second condition according to Embodiment 2. As illustrated in FIG. 25, when an item that satisfies the first condition is not ordered, the second condition is not satisfied. When the item is ordered and the item has not been delivered, the second condition is met. When the item is ordered and the item has already been delivered, the second condition is not met.

For example, in FIG. 24, the item whose item ID is 001 does not meet the second condition. However, the items whose item IDs are 002 and 003 meet the second condition.

When the second condition is not met (No in S602), processing proceeds to step S300. However, when the first condition is met (Yes in S602), processing proceeds to step S603.

[Step S603]

Processor 101 in information processing server 100 displays, on display terminal 200, a screen including information about an item that satisfies the first condition, information related to the amount of the item, and information indicating that the item has been ordered and has not been delivered. Hereinafter, information indicating that the item has been ordered and has not been delivered will simply be referred to as "unfulfilled order information". In other words, processor 101 transmits, to display terminal 200 via communication unit 103, information about a screen including information about an item that satisfies the first condition, information related to the amount of the item, and the unfulfilled order information for the item.

Figure 26:
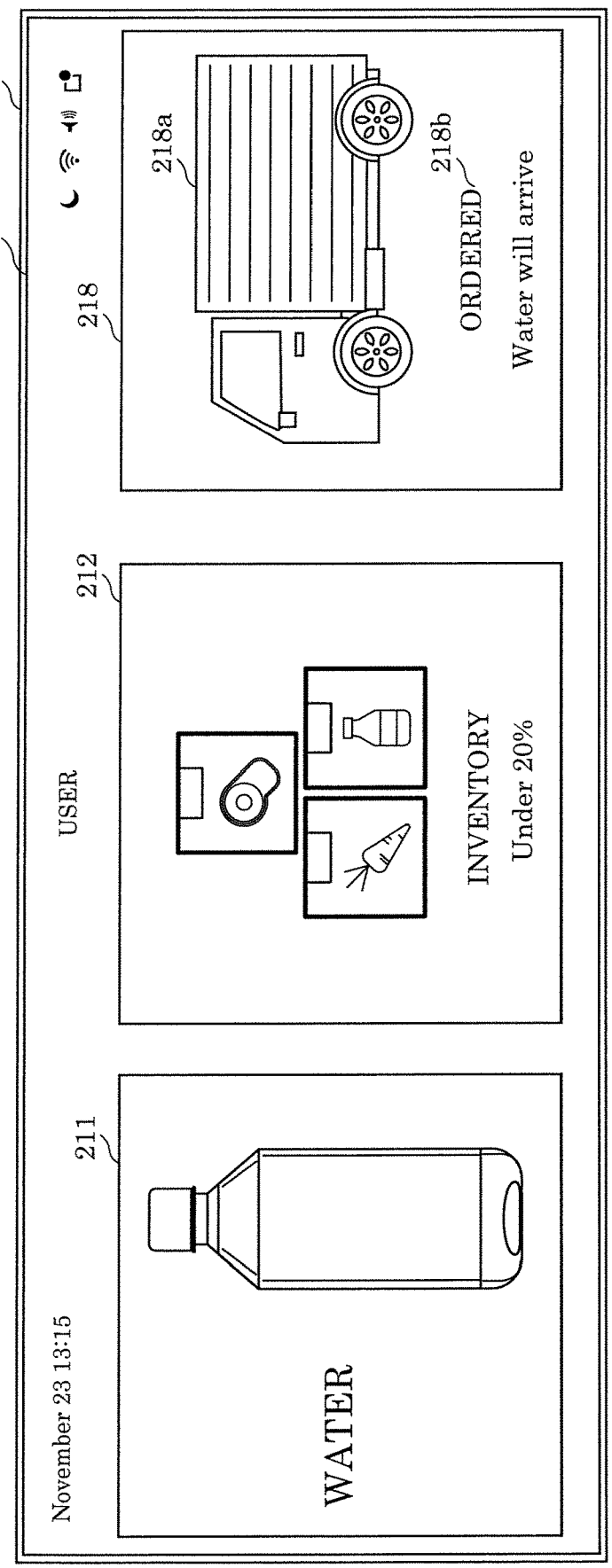
FIG. 26 illustrates one example of a screen including unfulfilled order information according to Embodiment 2.

FIG. 26 illustrates one example of a screen including unfulfilled order information according to Embodiment 2. In other words, FIG. 26 illustrates one example of a screen that is shown in step S603 in FIG. 23. Information 211 about an item, information 212 related to the amount of the item, and unfulfilled order information 218 for the item are displayed on display 204 of display terminal 200 in order from left to right on the screen. Information 211 about the item, information 212 related to the amount of the item, and unfulfilled order information 218 for the item are concurrently displayed on display 204, for example. In other words, the display of the three items of information may start concurrently. Moreover, for example, after information 211 about the item and information 212 related to the amount of the item are displayed, unfulfilled order information 218 may be displayed along with information 211 about the item and information 212 related to the amount of the item.

In FIG. 26, unfulfilled order information 218 for the item includes image 218a indicating that the item has not arrived, and characters 218b indicating that a product corresponding to the item has been ordered.

[Advantageous Effects, Etc.]

As described above, with information processing system 10 according to the present embodiment, when an item that satisfies the first condition has been ordered and has not been delivered, a screen including a suggestion to purchase a product corresponding to the item is not displayed, and in other cases, a screen including a suggestion to purchase a product corresponding to the item is displayed. In other words, it is possible to make a purchase suggestion to the user taking into consideration not only the amount of the item in the storage structure, but the fulfillment status of the order as well. This makes it possible to inhibit double ordering.

Embodiment 3

Next, Embodiment 3 will be described. This embodiment differs from Embodiment 1 described above in that when the amount of an item stored in the storage structure becomes less than or equal to a given amount, the purchase suggestion is displayed depending on the purchasing authority of the user. Hereinafter, the present embodiment will be specifically described with reference to the drawings, focusing on the points of difference with Embodiment 1 described above.

Note that since the configuration of information processing system 10 according to the present embodiment is essentially the same as Embodiment 1, repeated description and depiction in the drawings are omitted.

[Operations Performed by Information Processing System]

Figure 27:
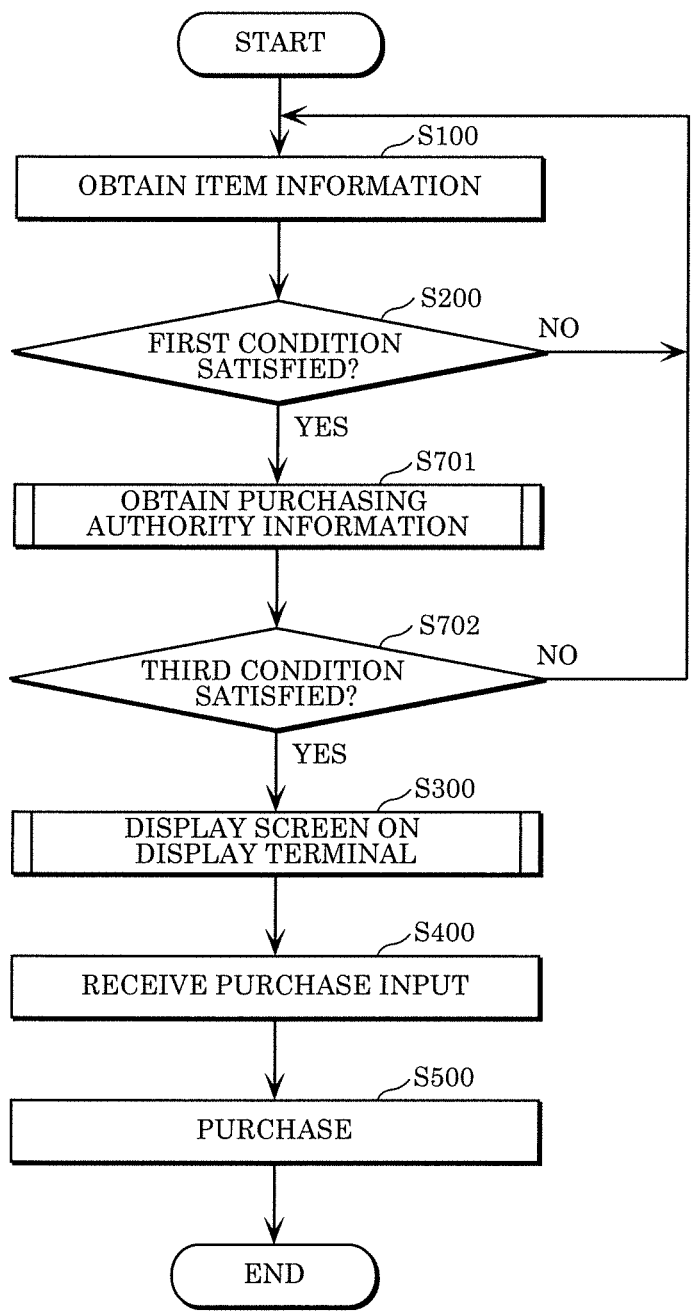
FIG. 27 is a flowchart illustrating processes performed by an information processing system according to Embodiment 3.

FIG. 27 is a flowchart illustrating processes performed by the information processing system according to Embodiment 3.

[Step S701]

After step S100 and step S200 are performed, when the first condition is satisfied, processor 101 in information processing server 100 obtains purchasing authority information.

Figure 28:
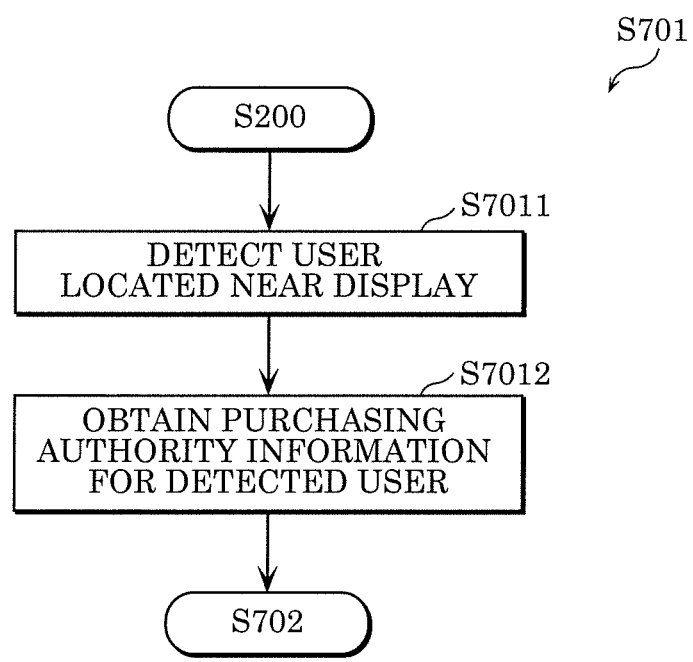
FIG. 28 is a flowchart illustrating screen processes performed by the information processing system according to Embodiment 3.

A specific example of the process of step S701 will be described with reference to FIG. 28. FIG. 28 is a flowchart illustrating screen processes performed by the information processing system according to Embodiment 3. Specifically, the flowchart in FIG. 28 illustrates the process of step S701 in FIG. 27 in detail.

[Step S7011]

Processor 101 in information processing server 100 and/or processor 201 in display terminal 200 detects a user located near the display 204. For example, display terminal 200 may include a camera (not illustrated in the drawings), and may capture an area in front of display 204 using the camera. In such cases, for example, information of the image captured is transmitted to information processing server 100. Processor 101 in information processing server 100 detects the user from the captured image. For example, processor 101 detects the user from the image using object recognition.

Note that the method used to detect the user from the image is not particularly limited; a conventional image recognition technique may be used. Moreover, the detection of the user from the image may be performed by display terminal 200 instead of information processing server 100, and may be performed by some other server.

[Step S7012]

Processor 101 in information processing server 100 obtains purchasing authority information corresponding to the detected user.

FIG. 29 illustrates one example of the purchasing authority information according to Embodiment 3. In FIG. 29, purchasing authorities are associated with user IDs. A user ID is an identifier for identifying a user. A purchasing authority indicates whether the user is permitted to purchase a product or prohibited from purchasing a product. In other words, a purchasing authority of "YES" indicates that the user is permitted to purchase a product, and a purchasing authority of "NO" indicates that the user is prohibited from purchasing a product.

For example, when the user detected in step S7011 has a user ID of A or C, processor 101 obtains a purchasing authority of "YES". When the user detected in step S7011 has a user ID of B, processor 101 obtains a purchasing authority of "NO".

[Step S702]

Processor 101 in information processing server 100 determines whether the obtained purchasing authority information satisfies a third condition or not. The third condition indicates that the user has purchasing authority. In other words, processor 101 determines whether the obtained purchasing authority information is "YES" or not.

When the third condition is not met (No in S702), processing returns to step S100. However, when the third condition is met (Yes in S702), processing proceeds to step S300. In other words, when the first condition and the third condition are met, a screen including a purchase suggestion is displayed, and when at least one of the first condition and the third condition is not met, a screen including a purchase suggestion is not displayed.

[Advantageous Effects, Etc.]

As described above, with information processing system 10 according to the present embodiment, when the amount of an item is less than or equal to a given amount and the user has purchasing authority, a screen including a purchase suggestion is displayed, and in other cases, a screen including a purchase suggestion is not displayed. This makes it possible to control display of a purchase suggestion depending on the purchasing authority of the user, which makes it possible to prevent ordering by a user who does not have purchasing authority.

Variation 1 of Embodiment 3

Next, Variation 1 of Embodiment 3 will be described. This variation differs from Embodiment 1 described above in that the authority information is associated with the display rather than a user. Hereinafter, the present variation will be specifically described with reference to the drawings, focusing on the points of difference with Embodiment 1 described above.

[Operations Performed by Information Processing System]

Figure 30:
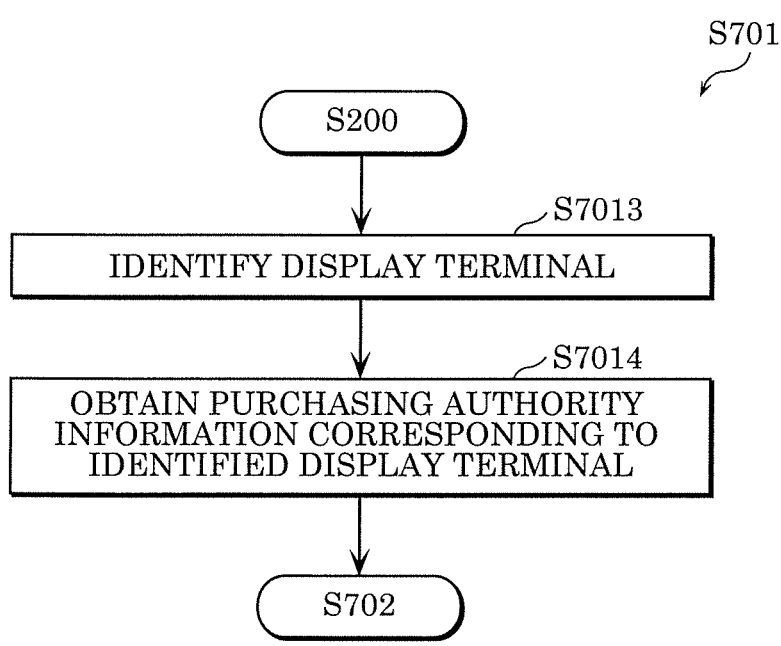
FIG. 30 is a flowchart illustrating screen processes performed by an information processing system according to Variation 1 of Embodiment 3.

FIG. 30 is a flowchart illustrating screen processes performed by the information processing system according to Variation 1 of Embodiment 3. Specifically, the flowchart in FIG. 30 illustrates the process of step S701 in FIG. 27 in detail.

[Step S7013]

Processor 101 in information processing server 100 identifies display terminal 200 that includes display 204. For example, processor 101 obtains a terminal ID from display terminal 200. A terminal ID is an identifier for identifying the terminal.

[Step S7014]

Processor 101 in information processing server 100 obtains purchasing authority information corresponding to the identified display terminal 200 (i.e., display 204).

FIG. 31 illustrates one example of the purchasing authority information according to Variation 1 of Embodiment 3. In FIG. 31, purchasing authorities are associated with terminal IDs. Purchasing authority indicates whether the display terminal has purchasing authority or not.

For example, when the display terminal 200 identified in step S7013 has a terminal ID of A1 or C3, processor 101 obtains a purchasing authority of "YES". For example, when the display terminal identified in step S7013 has a terminal ID of B2, processor 101 obtains a purchasing authority of "NO".

[Advantageous Effects, Etc.]

As described above, with information processing system 10 according to the present variation, when the amount of an item is less than or equal to a given amount and the purchasing authority information associated with display 204 indicates a purchasing authority of "YES", a screen including a purchase suggestion is displayed, and in other cases, a screen including a purchase suggestion is not displayed. For example, by not giving a display 204 located at a height reachable by a child purchasing authority and giving a display 204 located at a high unreachable by a child purchasing authority, it is possible to prevent erroneously placed orders by a child. Moreover, since it is not necessary to detect a user like in Embodiment 3, a device for that purpose (for example, a camera) is not required, which makes it possible to simplify the system configuration.

Embodiment 4

Next, Embodiment 4 will be described. The present embodiment differs from Embodiments 1 through 3 described above in regard to the first condition. Specifically, in the present embodiment, the first condition indicates that the expiration of an item stored in the storage structure falls within a given period. Hereinafter, the present embodiment will be specifically described with reference to the drawings, focusing on the points of difference with Embodiments 1 through 3 described above.

Note that since the configuration of information processing system 10 according to the present embodiment is essentially the same as Embodiments 1 through 3, repeated description and depiction in the drawings are omitted.

[Operations Performed by Information Processing System]

Processes performed by information processing system 10 according to the present embodiment will be described with reference to FIG. 3 and FIG. 32 through FIG. 34.

[Step S100]

Processor 301 in storage structure 300 obtains, via sensor 304, the information about the expiration of the item stored in storage structure 300. Here, step S100 will be described with reference to FIG. 15 and FIG. 32.

FIG. 32 illustrates one example of the information about the expiration of the item according to Embodiment 4.

In FIG. 15, a camera included in sensor 304 is disposed inside storage structure 300. Here, sensor 304 is image sensor 304B. The camera captures an image of items 31 stored in storage structure 300. For example, the camera captures the inside of storage structure 300 when a door of storage structure 300 is opened. Processor 301 obtains information about the expirations written on the fronts of items 31 by, for example, image analysis.

In FIG. 32, the information about the item expiration includes the current date, item IDs, and expirations. The expirations are associated with item IDs. For example, the expiration of item ID 001 is 3/26/2018, which is the following day relative to the current date of Mar. 25, 2018.

[Step S200]

Processor 101 in information processing server 100 determines whether the information about the expiration of the item satisfies the first condition or not. Specifically, processor 101 determines whether the expiration of the item falls within the given period or not.

The given period is the length of a period that is determined in advance for display control purposes. FIG. 33 illustrates one example of given period information according to Embodiment 4. The given period information is stored in memory 102, for example. In FIG. 33, the length of the given period is defined per item ID. For example, the length of the given period for the item identified by item ID 002 is two days.

When the first condition is not satisfied (No in S200), processing returns to step S100. However, when the first condition is satisfied (Yes in S200), processing proceeds to step S300.

[Step S300]

Processor 101 in information processing server 100 displays, on display 204 of display terminal 200, a screen including information about an item, information related to the expiration of the item, and a purchase suggestion. In other words, processor 101 transmits, to display terminal 200 via communication unit 103, information about a screen including information about an item, information related to the expiration of the item, and a purchase suggestion.

Figure 34:
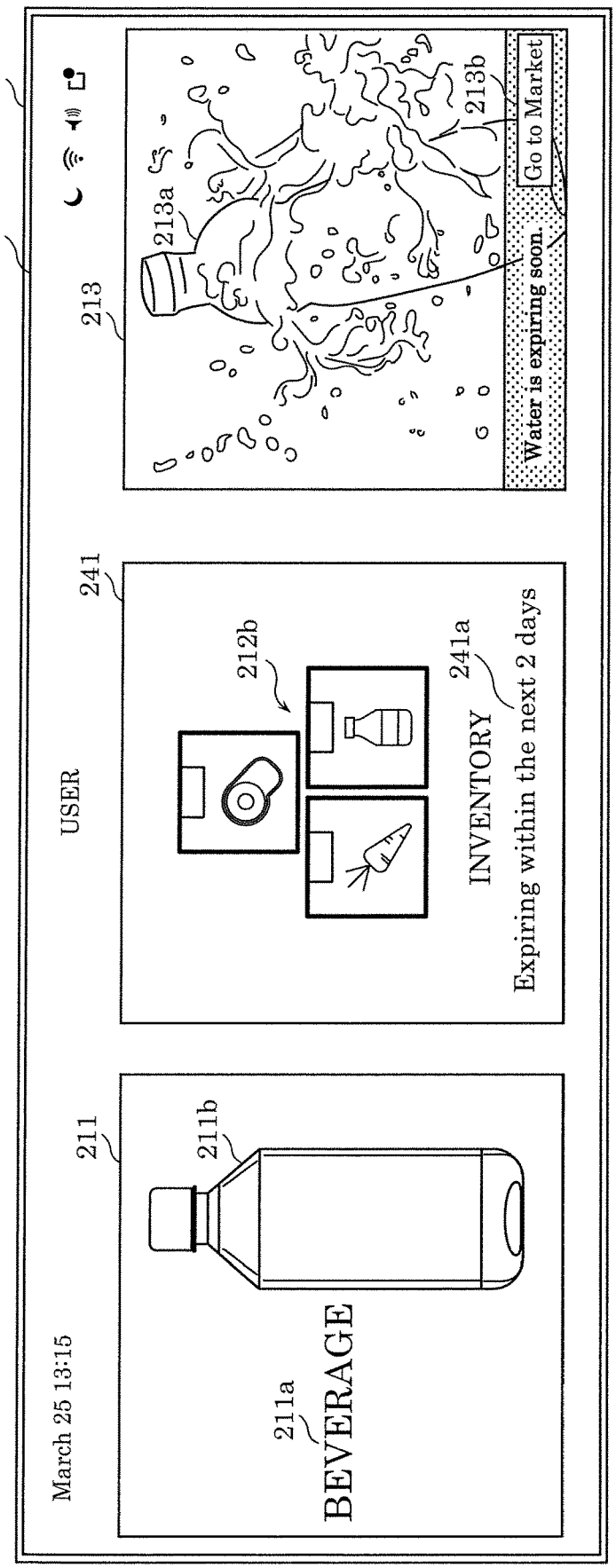
FIG. 34 illustrates one example of a first state of a first screen according to Embodiment 4.

FIG. 34 illustrates one example of a first state of the first screen according to Embodiment 4. Information 211 about an item, information 241 related to the expiration of the item, and purchase suggestion 213 are displayed on display 204 of display terminal 200 in order from left to right on the screen. Specifically, information 211 about the item, information 241 related to the expiration of the item, and purchase suggestion 213 are respectively displayed in three display regions aligned horizontally.

Here, the three display regions are of the same shape and size. Each of the three display regions is a square region that occupies approximately one third of the display region of display 204. Note that "the same" includes "precisely the same" and "essentially the same". In other words, "the same" means "approximately the same". Moreover, a "square" shape includes a precisely square shape and shapes within a range that would be recognized as being essentially the same as a precise square shape.

Information 211 about the item, information 241 related to the expiration of the item, and purchase suggestion 213 may be concurrently displayed on display 204, for example. In other words, the display of the three items of information may start concurrently. Moreover, for example, after information 211 about the item and information 241 related to the expiration of the item are displayed, purchase suggestion 213 may be displayed along with information 211 about the item and information 241 related to the expiration of the item.

In FIG. 34, information 241 related to the expiration of the item includes characters 241*a* indicating that the expiration of the item falls within the given period (in this example, two days), and image 212*b* related to inventory.

The reason for information 211 about the item, information 241 related to the expiration of the item, and purchase suggestion 213 being included in the first screen will be described. The first screen includes information 211 about the item so that the user can know what product included in storage structure 300 the information indicates when a plurality of items are stored in storage structure 300. The first screen includes information 241 related to the expiration of the item in order to indicate the state of the item indicated by information 211 about the item. With this, the user can know the items that are in storage structure 300 and the expirations of the items, by checking information 211 about the item and information 241 related to the expiration of the item included in first screen.

The first screen includes purchase suggestion 213 in order to prompt the user to perform a subsequent action, in accordance with information 211 about the item and information 241 related to the expiration of the item. The subsequent action by the user based on information 241 related to the expiration of the item is highly likely to be an act of purchasing the item, which is why purchase suggestion 213 is displayed. In other words, the first screen includes purchase suggestion 213 based on the assumption that the next action by the user which corresponds to the expiring of the item is the purchasing of the item.

In other words, the first screen includes information 211 about the item and information 241 related to the expiration of the item so that information related to a plurality of items stored in storage structure 300 can be easily checked. Furthermore, the first screen includes purchase suggestion 213 as the subsequent action by the user based on information 211 about the item and information 241 related to the expiration of the item.

Information 211 about an item represents which item in the storage structure is indicated, information 241 related to the expiration of an item indicates a state related to the item, and purchase suggestion 213 hypothesizes the subsequent action that will performed by the user corresponding to the expiring of the item. The user can check what the item is, the state of the item, and the subsequent action and perform the next action all at once, by looking at the first screen. For example, the first screen may include, as information related to the item, only information 211 about an item, information 241 related to the expiration of the item, and purchase suggestion 213.

Note that since the changing of states and screen transition of first screen illustrated in FIG. 34 is essentially the same as described in Embodiment 1, repeated description and depiction in the drawings is omitted.

[Step S400]

Input unit 205 in display terminal 200 receives an input of a purchase made by the user on the screen displayed on display 204. For example, input unit 205 receives, as an input of a purchase, an input of a touch gesture made by the user on an order button in FIG. 13.

[Step S500]

Processor 201 in display terminal 200 performs a purchase process. For example, processor 201 in display terminal 200 transmits order information to information processing server 100 via communication unit 203. Information processing server 100 then orders the product by transmitting the order information to sales server 20.

[Advantageous Effects, Etc.]

As described above, with information processing system 10 according to the present embodiment, when the first condition is satisfied, it is possible to cause display 204 to display a screen including information about an item, information related to the expiration of the item, indicating that the expiration of the item falls within a given period, and a suggestion to purchase a product corresponding to the item. This makes it possible to smoothly purchase a product after checking which items and when those items will expire. In other words, information processing system 10 can effectively provide the user with information for suggesting the purchase of a product.

Moreover, with information processing system 10 according to the present embodiment, it is possible to display, in order from left to right of the screen, information about the item, information related to the expiration of the item, and a purchase suggestion. With this, the user can easily know which items and when those items will expire, by looking at the screen from left to right. Accordingly, information processing system 10 can improve the visibility of the screen.

Variation 1 of Embodiment 4

Next, Variation 1 of Embodiment 4 will be described. This variation differs from Embodiment 1 described above in regard to the configuration of the screen including information about an item, information related to the expiration of the item, and a suggestion to purchase a product corresponding to the item. Hereinafter, the present variation will be specifically described with reference to the drawings, focusing on the points of difference with Embodiment 1 described above.

Figure 35:
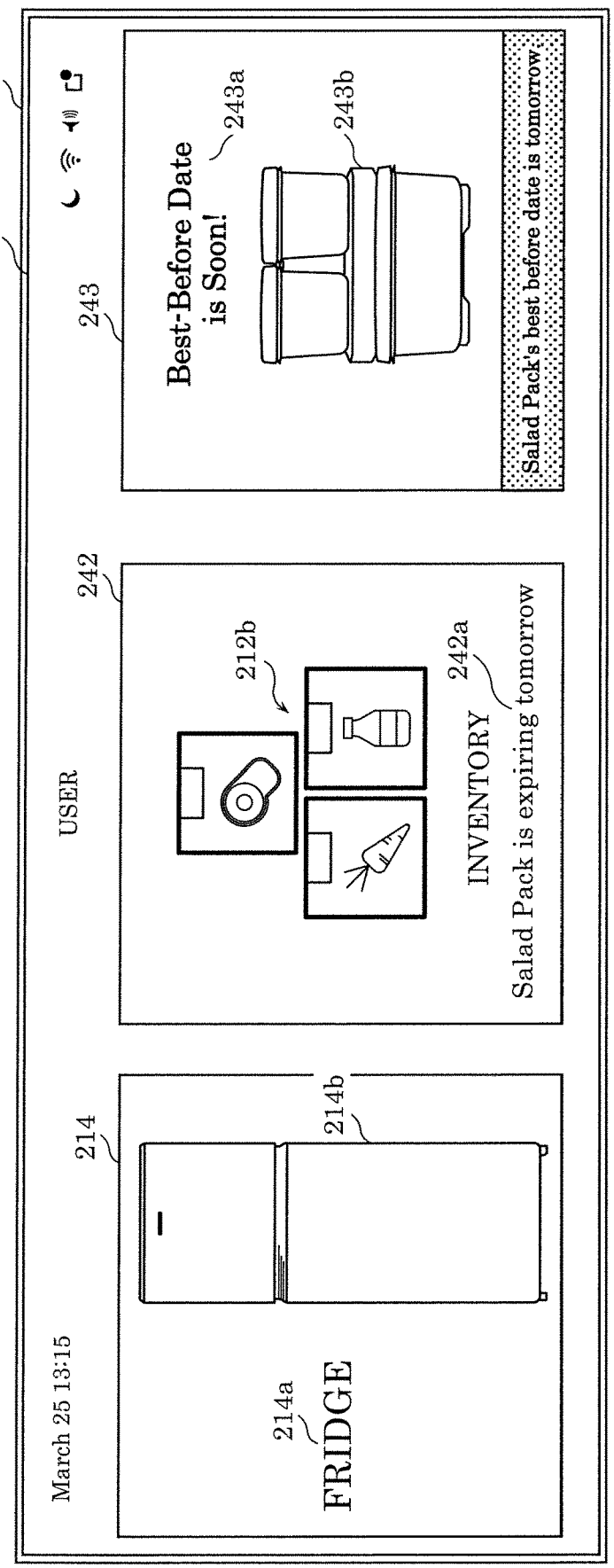
FIG. 35 illustrates one example of a first screen according to Variation 1 of Embodiment 4.

FIG. 35 illustrates one example of a first screen according to Variation 1 of Embodiment 4. In FIG. 35, storage structure information 214, information 242 related to items and the expiration of an item, and purchase suggestion 243 are displayed in order on display 204 of display terminal 200.

Storage structure information 214 includes characters 214a and image 214b that indicate the storage structure. Information 242 related to items and the expiration of an item includes characters 242a indicating that the expiration of the item (in this example, a salad pack) falls within the given period (in this example, one day), and image 212b related to inventory. Purchase suggestion 243 includes characters 243a indicating that the expiration of the item is approaching, and image 243b of a product corresponding to the item.

In this way, with this variation, it is possible to display storage structure information, which allows the user to visually recognize which items in the storage structure have expirations that are approaching.

Embodiment 5

Next, Embodiment 5 will be described. The present embodiment differs from Embodiment 1 in that a purchase suggestion is displayed depending on, in addition to the inventory of an item in a first storage structure, the inventory of an item in a second storage structure that is different from the first storage structure. Hereinafter, the present embodiment will be specifically described with reference to the drawings, focusing on the points of difference with Embodiment 1 described above.

[Configuration of Information Processing System]

Figure 36:
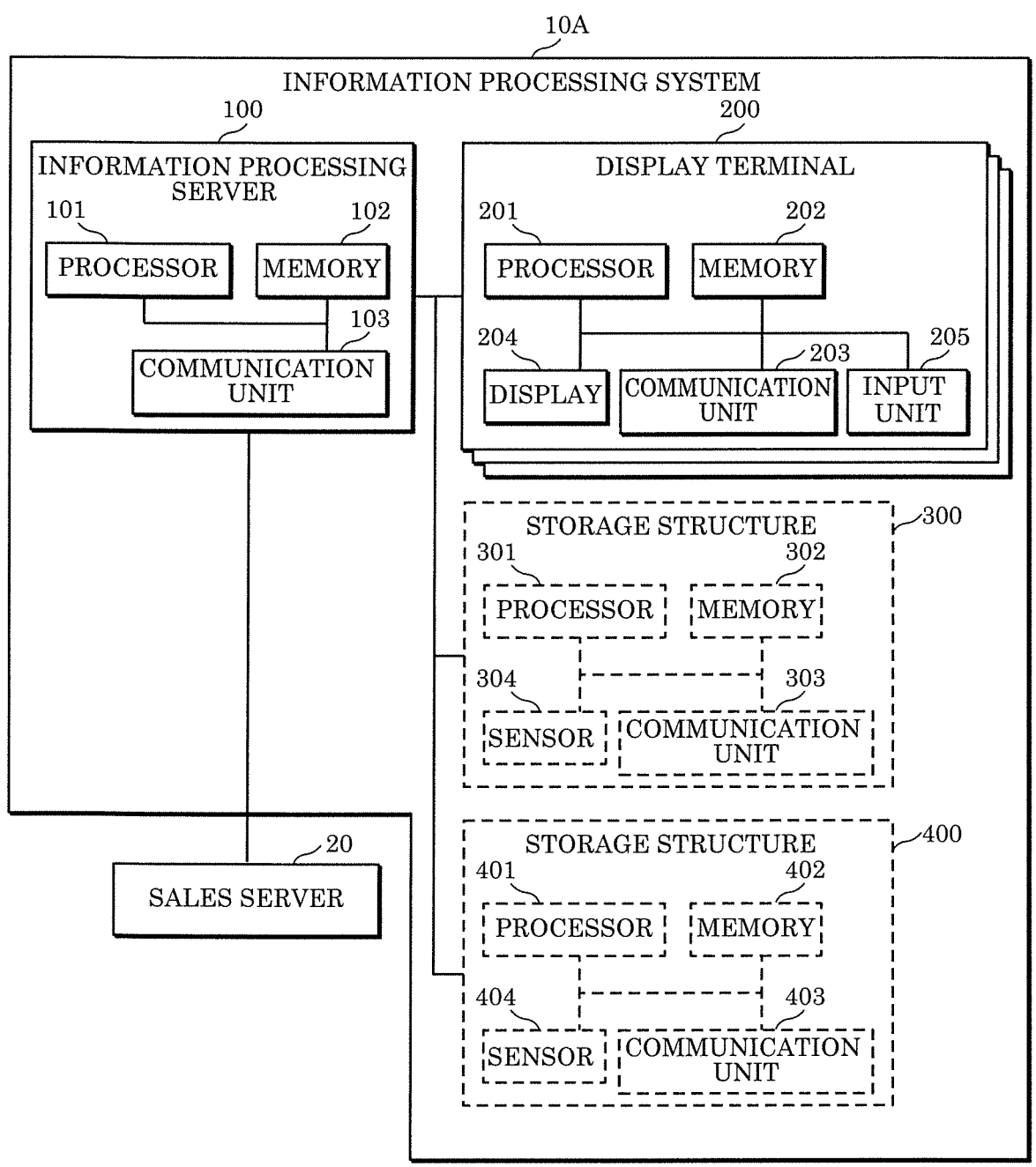
FIG. 36 is a block diagram illustrating a functional configuration of an information processing system according to Embodiment 5.

FIG. 36 is a block diagram illustrating the functional configuration of the information processing system according to Embodiment 5. As illustrated in FIG. 36, information processing system 10A according to the present embodiment includes: information processing server 100; one or more display terminals including display terminal 200; storage structure 300; and storage structure 400. Storage structure 300 is one example of the first storage structure, and storage structure 400 is one example of the second storage structure.

In the present embodiment, the amount of an item stored in storage structure 300 is referred to as the first amount, and the amount of an item stored in storage structure 400 is referred to as the second amount.

[Configuration of Second Storage Structure]

Next, the configuration of storage structure 400 will be described. Storage structure 400 stores one or more items. Storage structure 400 is, for example, a pantry or shelf. Moreover, storage structure 400 may be a refrigerator. As illustrated in FIG. 36, storage structure 400 includes processor 401, memory 402, communication unit 403, and sensor 404.

Processor 401 is electronic circuitry that is connected to memory 402. Processor 401 obtains information about the second amount of an item based on the second amount of the item detected by sensor 404. The information about the second amount of the item is transmitted to information processing server 100 by communication unit 403.

Memory 402 is, for example, semiconductor memory and/or a hard disk drive. Memory 402 can store a software program or instructions. When the software program or the instructions stored in memory 402 is executed, processor 401 performs various processes. Moreover, memory 402 can store the information about the second amount of the item obtained by sensor 404.

Communication unit 403 is a network adapter for performing one or both of wired and wireless communication with information processing server 100 via a communication network. Communication unit 403 transmits the information about the second amount of the item to information processing server 100.

Sensor 404 detects the second amount of an item. Here, sensor 404 detects, for example, the number of containers containing, for example, a beverage or condiment, and the number of foodstuffs.

[Operations Performed by Information Processing System]

Figure 37:
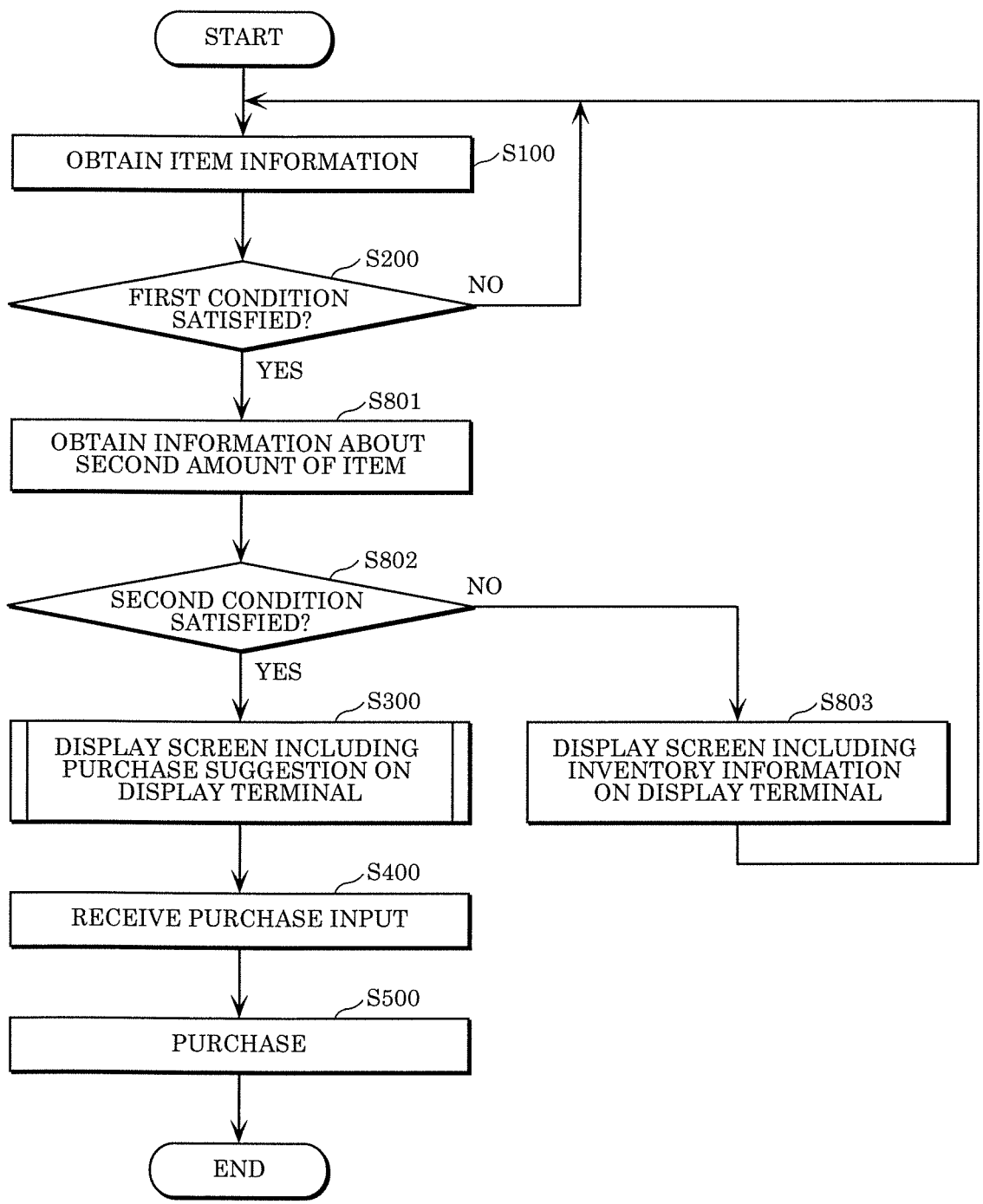
FIG. 37 is a flowchart illustrating processes performed by the information processing system according to Embodiment 5.

Next, processes performed by information processing system 10A according to the present embodiment and configured as described above will be described with reference to FIG. 37 and FIG. 38. FIG. 37 is a flowchart illustrating processes performed by the information processing system according to Embodiment 5.

[Step S200]

After step S100 is performed, in step S200, whether information about the first amount of an item satisfies a first condition or not is determined. The first condition indicates that the first amount of an item stored in storage structure 300 is less than or equal to a first given amount.

When the first condition is not satisfied (No in S200), processing returns to step S100. However, when the first condition is satisfied (Yes in S200), processing proceeds to step S801.

[Step S801]

Processor 401 in storage structure 400 obtains, via sensor 404, the information about a second amount of an item stored in storage structure 400. For example, processor 401 obtains information about a second amount of an item stored in storage structure 400, in the same manner as in storage structure 300 according to Embodiment 1.

[Step S802]

Processor 101 in information processing server 100 determines whether the information about the second amount of the item obtained in step S801 satisfies a second condition or not. In the present embodiment, the second condition indicates that the second amount of an item stored in storage structure 400 is less than or equal to a second given amount. In other words, processor 101 determines whether the second amount of the item is less than or equal to the second given amount.

When the second condition is met (Yes in S802), processing proceeds to step S300. However, when the second condition is not met (No in S802), processing proceeds to step S803.

[Step S803]

Processor 101 in information processing server 100 causes display terminal 200 to display a screen including information about the item that satisfies the first condition, information related to the first amount of the item, and information indicating that the item is stored in storage structure 400 (hereinafter referred to as item inventory information). In other words, processor 101 transmits, to display terminal 200 via communication unit 103, information about a screen including information about an item that satisfies the first condition, information related to the amount of the item, and the item inventory information.

Figure 38:
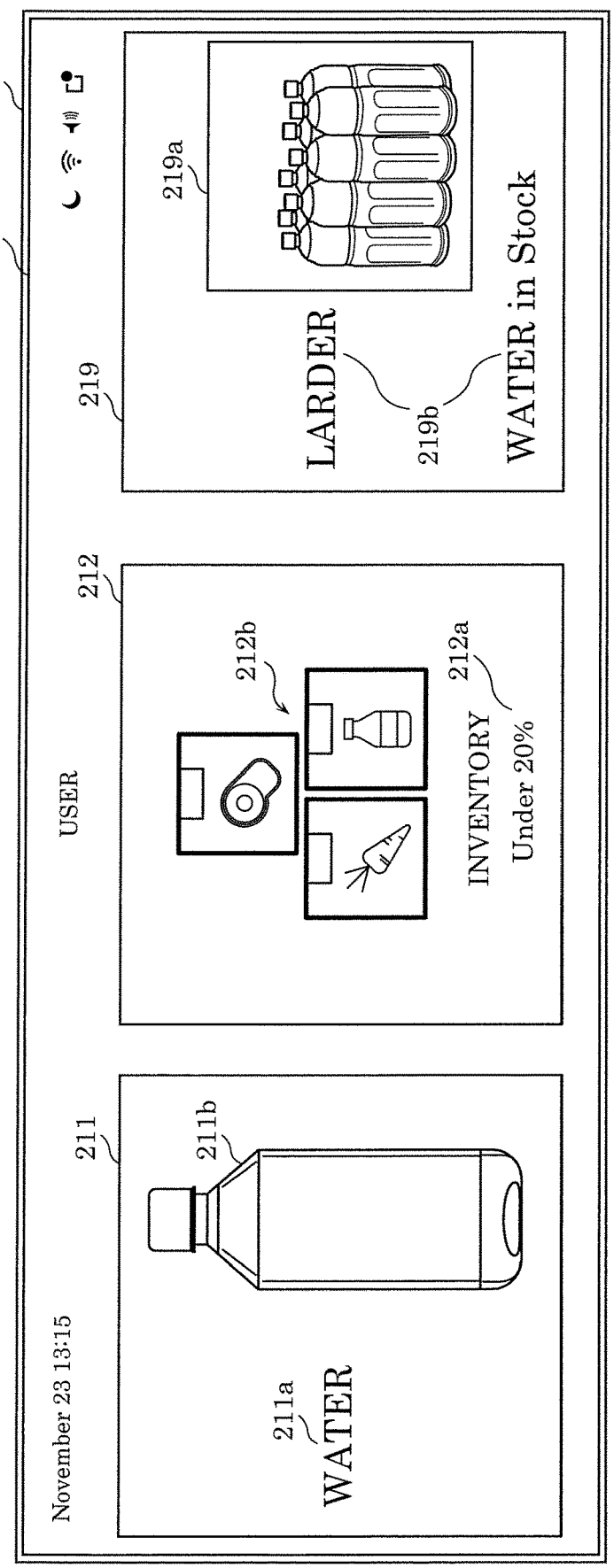
FIG. 38 illustrates one example of a screen including item inventory information according to Embodiment 5.

FIG. 38 illustrates one example of a screen including item inventory information according to Embodiment 5. In other words, FIG. 38 illustrates one example of a screen that is shown in step S803 in FIG. 37. Information 211 about an item, information 212 related to the amount of the item (information related to the first amount of the item), and item inventory information 219 are displayed on display 204 of display terminal 200 in order from left to right on the screen. Information 211 about the item, information 212 related to the amount of the item, and item inventory information 219 are concurrently displayed on display 204, for example. In other words, the display of the three items of information may start concurrently. Moreover, for example, after information 211 about the item and information 212 related to the amount of the item are displayed, item inventory information 219 may be displayed along with information 211 about the item and information 212 related to the amount of the item. In other words, information 211 about the item and information 212 related to the amount of the item are displayed, and subsequently item inventory information 219 may be displayed lastly.

In FIG. 38, item inventory information 219 includes image 219a indicating storage structure 400 and characters 219b indicating that the item is stored in storage structure 400.

Note that in FIG. 38, the screen includes information 212 related to the amount of the item, but information 212 related to the amount of the item need not be included.

[Advantageous Effects, Etc.]

As described above, with information processing system 10A according to the present embodiment, when an item that satisfies the first condition is stored in storage structure 400, a screen including a suggestion to purchase a product corresponding to the item is not displayed, and in other cases, a screen including a suggestion to purchase a product corresponding to the item is displayed. In other words, it is possible to make a purchase suggestion to the user taking into consideration not only the first amount of the item in storage structure 300, but the second amount of the item in storage structure 400 as well. This makes it possible to inhibit ordering more than is necessary and excess inventory.

Embodiment 6

Next, Embodiment 6 will be described. In this embodiment, a service providing system that provides a service including providing information for a screen displayed on a display terminal will be described.

[Overall Picture of Provided Services]

Figure 39A:
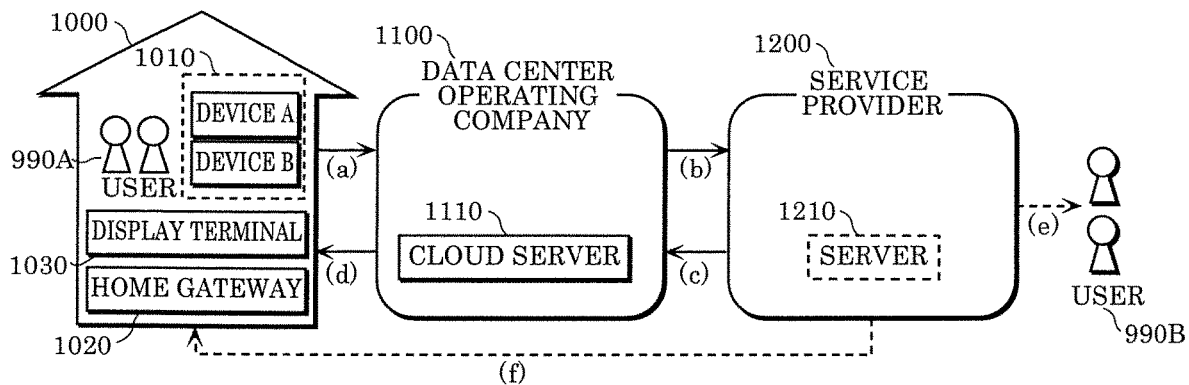
FIG. 39A illustrates an overall picture of a service providing system according to Embodiment 6.

FIG. 39A illustrates an overall picture of the service providing system according to Embodiment 6.

Group 1000 is, for example, a business, organization, home, etc., and the size thereof is irrelevant. Group 1000 includes device A, device B belonging to plural devices 1010, display terminal 1030, and home gateway 1020. For example, device A is the storage structure according to any of the above embodiments. Plural devices 1010 include devices that can connect to the internet (for example, a smartphone, PC, TV, etc.) and devices that cannot connect to the internet themselves (for example, a lighting device, a washing machine, etc.). Devices that cannot connect to the internet themselves may include devices that can connect to the internet through home gateway 1020. Group 1000 further includes user 990A that uses plural devices 1010.

Figure 39B:
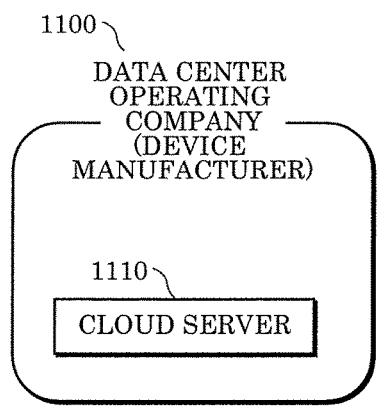
FIG. 39B illustrates one example of a data center operating company according to Embodiment 6.
Figure 39C:
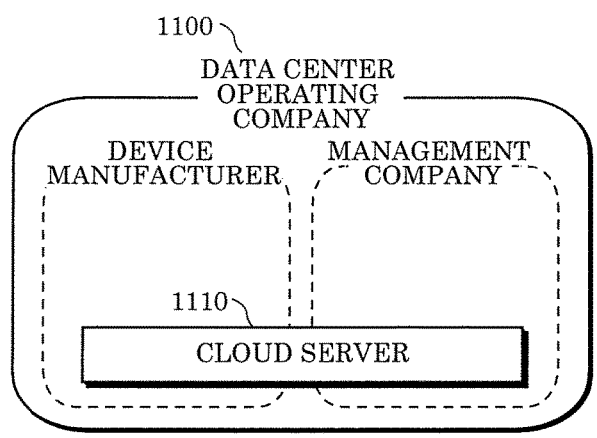
FIG. 39C illustrates one example of the data center operating company according to Embodiment 6.

Data center operating company 1100 includes cloud server 1110. Cloud server 1110 is a virtual server that links various devices over the internet. For example, cloud server 1110 is the information processing server according to any of the above embodiments. Cloud server 1110 mainly manages, for example, big data, which is difficult to manage using, for example, normal database management tools. Data center operating company 1100 operates a data center that performs data management and management of cloud server 1110. Services provided by data center operating company 1100 will be described in detail later. Note that data center operating company 1100 is not limited to a company that only performs data management and management of cloud server 1110. For example, when a device manufacturer that develops and manufactures one device among plural devices 1010 also performs, for example, data management and management of cloud server 1110, that device manufacturer corresponds to data center operating company 1100 (FIG. 39B). Moreover, data center operating company 1100 is not limited to a single company. For example, when a device manufacturer and some other management company are in consort or divide up data management and management of cloud server 1110 operations, both or one of the device manufacturer and management company corresponds to data center operating company 1100 (FIG. 39C).

Service provider 1200 possesses server 1210. "Server 1210" herein includes, for example, memory found in a personal-use PC, and the size thereof is irrelevant. Moreover, cases in which the service provider does not possess server 1210 are conceivable.

Note that home gateway 1020 is not essential in the services described above. For example, when cloud server 1110 performs all data management operations, home gateway 1020 is not necessary. Moreover, note that there are cases in which there are no devices that cannot connect to the internet themselves, such as when all devices in a home are connected to the internet.

Next, the flow of information in the services described above will be described.

First, device A or device B in group 1000 transmits information obtained by the device to cloud server 1110 in data center operating company 1100. Cloud server 1110 accumulates information from device A or device B ((a) in FIG. 39A). Accumulated information described herein is information indicating, for example, the operational status, operation date and time, operation mode, position, etc., of plural devices 1010. Examples of the accumulated information include, but are not limited to, television viewing history, television recorder recording schedule information, washing machine operation date and time and amount of laundry, dates and times of the opening and closing of a refrigerator and the total number of times of the opening and closing, and amount of a foodstuff in a refrigerator. However, the accumulated information refers to all information that is obtainable from any kind of device. Information may be provided directly from plural devices 1010 to cloud server 1110 over the internet. Alternatively, information may be temporarily collected by home gateway 1020 from plural devices 1010, and then provided to cloud server 1110 from home gateway 1020.

Next, cloud server 1110 in data center operating company 1100 provides the accumulated information to service provider 1200 in a certain unit. Here, a certain unit may be a unit in which information accumulated by a data center operating company can be managed and provided to service provider 1200, and may be a unit requested by service provider 1200. Although this unit is referred to as a "certain" unit, this unit does not need to be constant; the amount of information provided may vary depending on the situation. Information is stored in server 1210 possessed by service provider 1200 as necessary ((b) in FIG. 39A). Then, service provider 1200 organizes the information so as to be suitable for the service to be provided to the user, and provides the organized information to the user. The user provided with the service may be user 990A that uses plural devices 1010, and may be external user 990B. The method of providing the service to the user may be a method whereby the service is directly provided to the user by the service provider ((e), (f) in FIG. 39A). Moreover, the method of providing the service to the user may be a method whereby the service is provided to the user via cloud server 1110 in data center operating company 1100 ((c), (d) in FIG. 39A). Moreover, cloud server 1110 in data center operating company 1100 may organize the information so as to be suitable for the service to be provided to the user, and provide the organized information to service provider 1200.

Note that user 990A and user 990B may be different user, and may be the same user.

The techniques described in the above aspect can be realized as the following types of cloud services. However, the types of cloud services that the techniques described in the above aspect are realized as are not limited to the following examples.

[Service Type 1: Inclusive Data Center]

Figure 40:
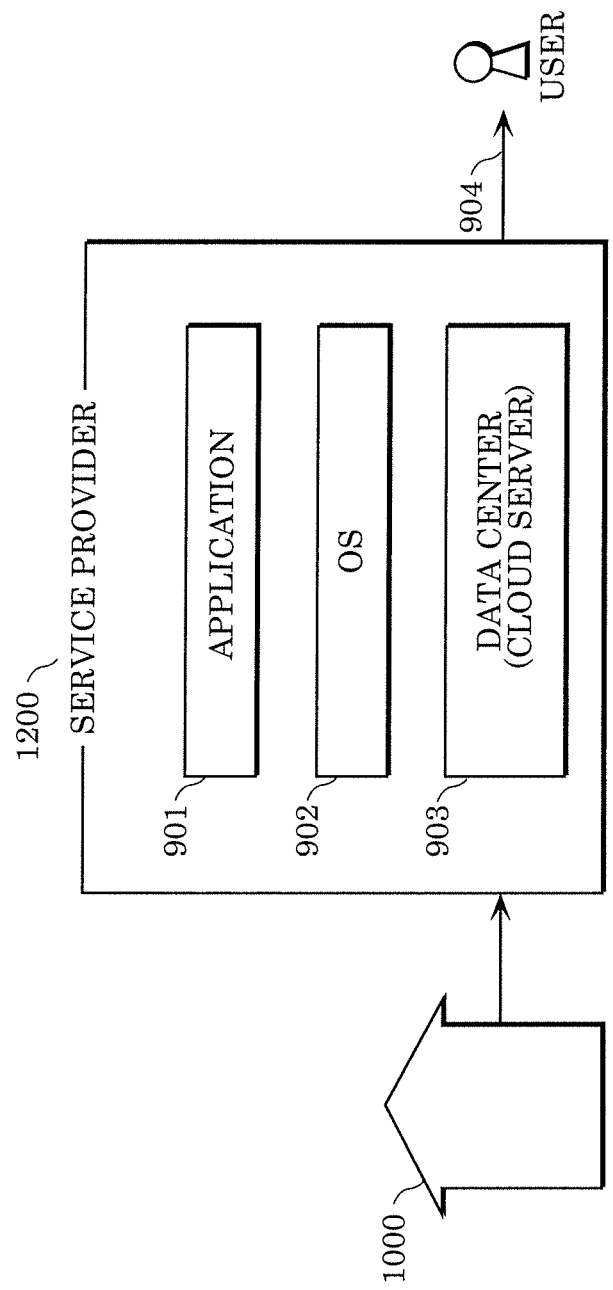
FIG. 40 illustrates service type 1 (inclusive data center) according to Embodiment 6.

FIG. 40 illustrates service type 1 (inclusive data center). With this type, service provider 1200 obtains information from group 1000, and provides the service to the user. In this type, service provider 1200 includes the function of a data center operating company. In other words, the service provider possesses cloud server 1110 that manages big data. Accordingly, there is no data center operating company.

In this type, service provider 1200 operates and manages data center 903 (cloud server 1110). Moreover, service provider 1200 manages OS 902 and application 901. Service provider 1200 provides service 904 using OS 902 and application 901 managed by service provider 1200.

[Service Type 2: Iaas]

Figure 41:
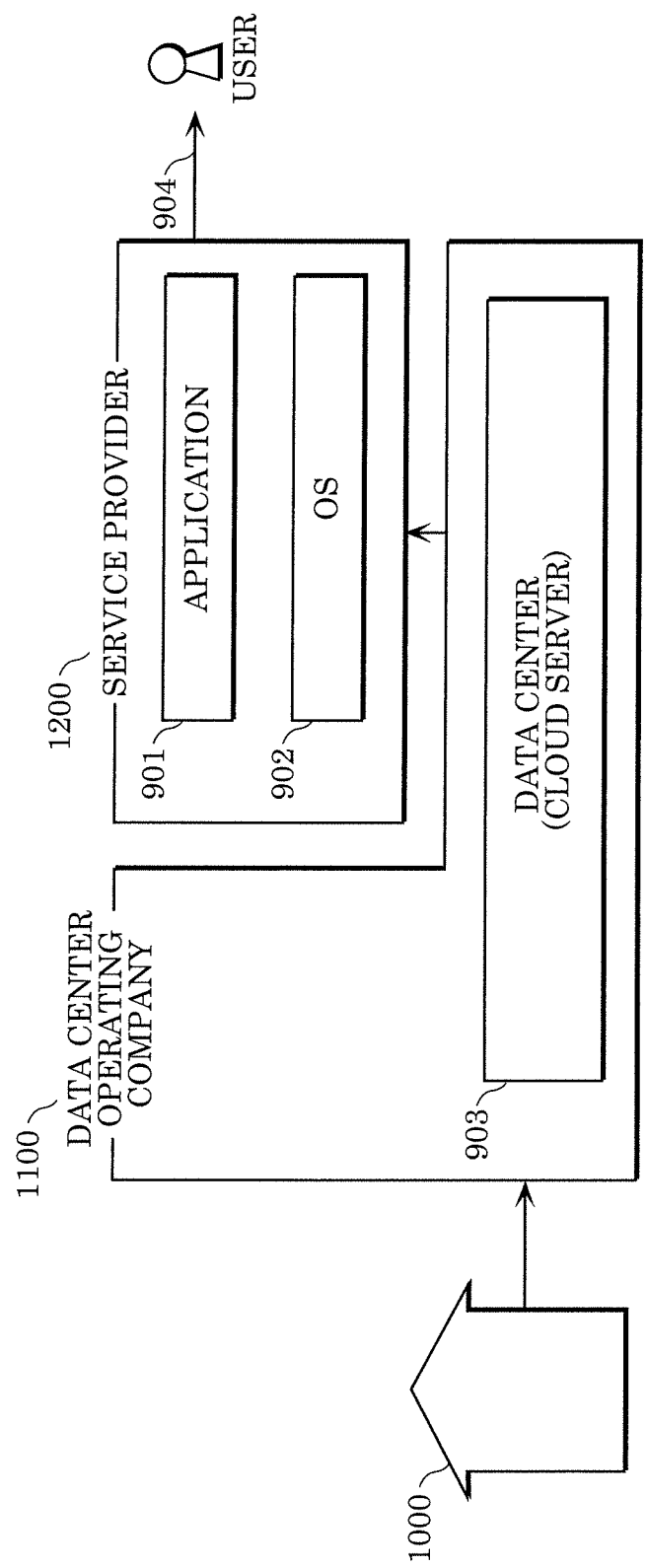
FIG. 41 illustrates service type 2 (IaaS) according to Embodiment 6.

FIG. 41 illustrates service type 2 (IaaS). Here, IaaS stands for infrastructure as a service, and is a model for providing a cloud service that provides the foundation for structuring and operating a computer system over the internet as a service.

In this type, data center operating company 1100 operates and manages data center 903 (cloud server 1110). Moreover, service provider 1200 manages OS 902 and application 901. Service provider 1200 provides service 904 using OS 902 and application 901 managed by service provider 1200.

[Service Type 3: Paas]

Figure 42:
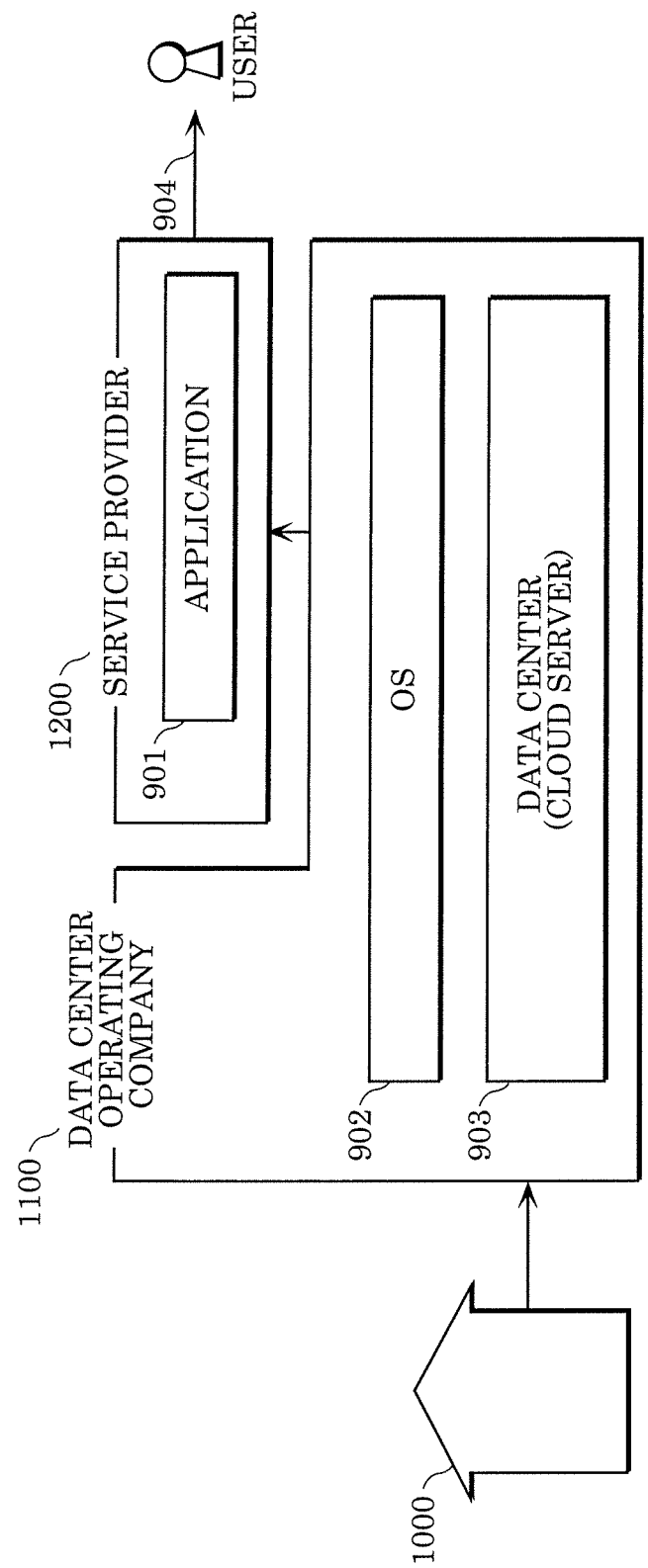
FIG. 42 illustrates service type 3 (PaaS) according to Embodiment 6.

FIG. 42 illustrates service type 3 (PaaS). Here, PaaS stands for platform as a service, and is a model for providing a cloud service that provides a platform for structuring and operating software over the internet as a service.

In this type, data center operating company 1100 manages OS 902 and operates and manages data center 903 (cloud server 1110). Moreover, service provider 1200 manages application 901. Service provider 1200 provides service 904 using OS 902 managed by the data center operating company and application 901 managed by service provider 1200.

[Service Type 4: Saas]

Figure 43:
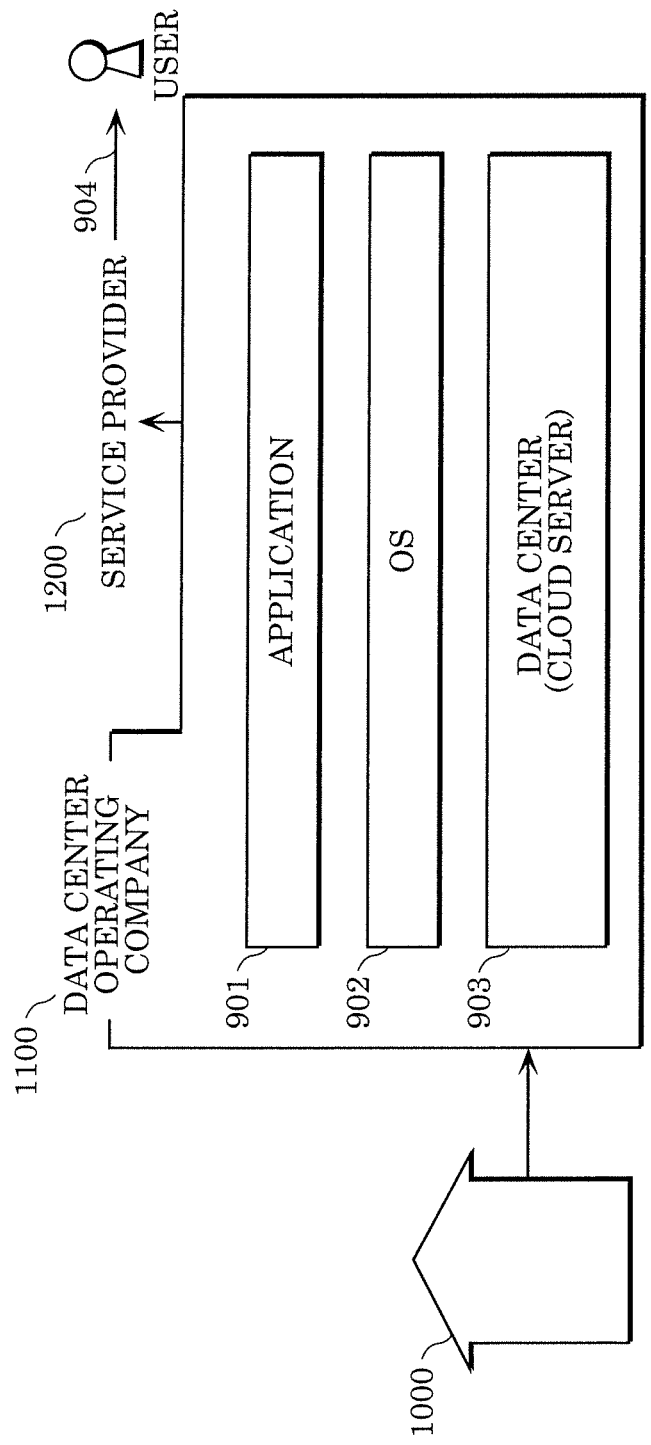
FIG. 43 illustrates service type 4 (SaaS) according to Embodiment 6.

FIG. 43 illustrates service type 4 (SaaS). Here, SaaS stands for software as a service. For example, SaaS is a model for providing a cloud service that has a function whereby an application provided by a platform provider that possesses a data center (cloud server) can be used via a network such as the internet by a company or individual (user) that does not possess the data center (cloud server).

In this type, data center operating company 1100 manages application 901, manages OS 902, and manages and operates data center 903 (cloud server 1110). Moreover, service provider 1200 provides service 904 using OS 902 and application 901 managed by data center operating company 1100.

In any of the above types, service provider 1200 performs an act of providing a service. Moreover, for example, the service provider or data center operating company may develop, for example, the OS, application, and big data database themselves, or outsource the development to a third party.

OTHER EMBODIMENTS

Hereinbefore, an information processing system according to one or more aspects of the present disclosure has been described based on embodiments, but the present disclosure is not limited to the embodiments. Various modifications of the embodiments as well as embodiments resulting from arbitrary combinations of elements of different embodiments that may be conceived by those skilled in the art are intended to be included within the scope of the one or more aspects of the present disclosure as long as they do not depart from the essence of the teachings of the present disclosure.

For example, Embodiment 1 and the variations thereof, Embodiment 2, Embodiment 3 and the variations thereof, Embodiment 4 and the variations thereof, and Embodiment 5 may be arbitrarily combined. If Embodiment 1 and Embodiment 4 are combined, when information about both the amount and expiration of an item satisfies the first condition, a screen including: information about the item, both information related to the amount of the item and information related to the expiration of the item; and a purchase suggestion for a product can be displayed on the display.

Moreover, for example, if Embodiment 2 and Embodiment 5 are combined, when the first condition and the second condition according to Embodiment 5 are satisfied, and the second condition according to Embodiment 2 is not satisfied, processor 101 in information processing server 100 can display, on display 204, a screen including information about an item, information related to a first amount of the item, indicating that the amount of the item is less than or equal to a given amount, and a suggestion to purchase a product corresponding to the item. On the other hand, when all of the first condition, the second condition according to Embodiment 5, and the second condition according to Embodiment 2 are satisfied, processor 101 in information processing server 100 can display, on display 204, a screen including information about an item, information related to a first amount of the item, and information indicating that the item has been ordered and the item has not been delivered.

Figure 44:
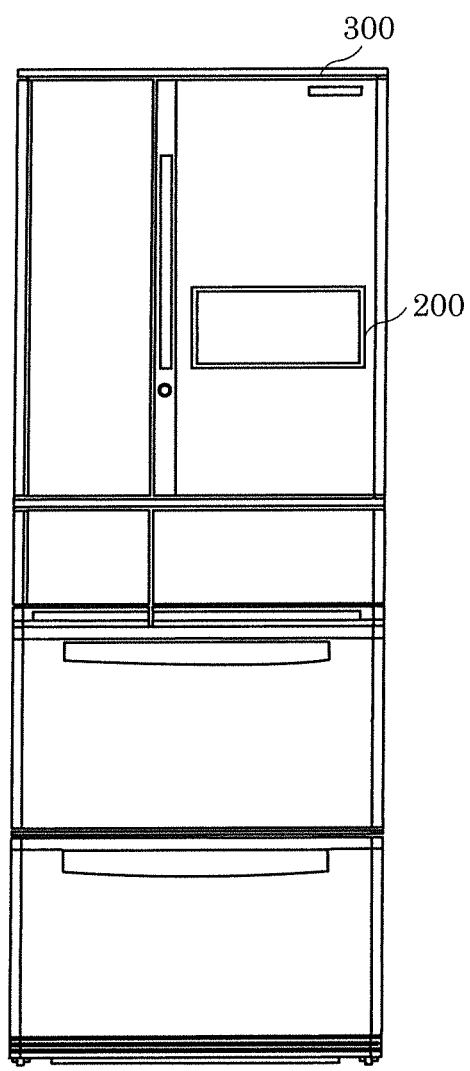
FIG. 44 is an external view of an information processing system according another embodiment.

Note that in the above embodiments, display terminal 200 is disposed distanced from storage structure 300, but this example is not limiting. For example, as illustrated in FIG. 44, display terminal 200 may be provided on the door of storage structure 300. Moreover, for example, display terminal 200 may be a portable information terminal having a display (for example, a smartphone or tablet computer).

Note that in the above embodiments, in the plural items of product information included in the second screen, the names of the products are mutually different, but this example is not limiting. For example, in the plural items of product information, the names of the products may be the same but the seller or price of the products may be different. In such cases, the information server may obtain product information from a plurality of sales servers.

Note that in the above embodiments, the storage structure is included in the information processing system, but this example is not limiting. For example, information processing system may not include the storage structure. In such cases, information on the amount of the item may be input into the information processing system by the user. Moreover, the information processing system may include a sensor that is detachable from the storage structure. In such cases, the detachable sensor may include a processor, memory, and a communication unit.

Note that the screens shown in the drawings described in the above embodiments are non-limiting examples. For example, the sizes and shapes of the display regions for the three items of information need not be the same.

Moreover, rather than such an information processing system, one aspect of the present disclosure may be a control method including steps of processes performed by a processor included in information processing system. Moreover, one aspect of the present disclosure may be a computer program that causes a computer to execute characteristic steps included in the control method. Moreover, one aspect of the present disclosure may be a non-transitory computer-readable recording medium having such a computer program recorded thereon.

Such a program may cause a computer to execute: (a) obtaining information about at least one of an amount and an expiration of an item stored in a storage structure; (b) determining whether the information about at least one of the amount and the expiration of the item satisfies a first condition or not, the first condition indicating at least one of that the amount of the item is less than or equal to a given amount and that the expiration of the item falls within a given period; and (c) when the first condition is satisfied, displaying, on a display, a screen including: information about the item; at least one of (i) information related to the amount of the item, indicating that the amount of the item is less than or equal to the given amount and (ii) information related to the expiration of the item, indicating that the expiration of the item falls within the given period; and a purchase suggestion for a product corresponding to the item.

Moreover, the program may cause a computer to execute: (j) obtaining information about a first amount of an item stored in a first storage structure; (k) determining whether the information about the first amount of the item satisfies a first condition or not, the first condition indicating that the first amount of the item is less than or equal to a first given amount; (l) when the first condition is satisfied, obtaining information about a second amount of the item stored in a second storage structure; (m) determining whether the information about the second amount of the item satisfies a second condition or not, the second condition indicating that the second amount of the item is less than or equal to a second given amount; (n) when the second condition is satisfied, displaying, on a display, a screen including: information about the item; information related to the first amount of the item, indicating that the first amount of the item is less than or equal to the first given amount; and a purchase suggestion for a product corresponding to the item; and when the second condition is not satisfied, displaying, on the display, a screen including the information about the item and information indicating that the item is stored in the second storage structure.

INDUSTRIAL APPLICABILITY

Application is possible in an information processing system that suggests the purchase of a foodstuff stored in a refrigerator.

What is claimed is:

1. A control method for an information processing apparatus including a processor, the control method comprising:
(a) configuring the processor of the information processing apparatus to communicate over a communication network with a storage structure, a display terminal located at the storage structure, and a sales server;
(b) storing, in the storage structure, one or more items;
(c) receiving, over the communication network at the processor of the information processing apparatus from the sales server, product information identifying a product corresponding to the one or more items stored in the storage structure;
(d) determining, by a sensor at the storage structure, item information including at least one of an amount of the one or more items stored in the storage structure and an expiration of the one or more items stored in the storage structure that falls within a given period;
(e) receiving, by the processor of the information processing apparatus, the item information from the sensor including the at least one of the amount of the one or more items stored in the storage structure and the expiration of the one or more items stored in the storage structure that falls within the given period;
(f) determining, by the processor of the information processing apparatus, whether a first condition is satisfied by at least one of the amount of the one or more items stored in the storage structure being less than or equal to a given amount and that the expiration of the one or more items stored in the storage structure falls within the given period;
(g) based on the first condition being satisfied, sending, by the processor of the information processing apparatus to the display terminal, a first screen including information about the one or more items, the at least one of the amount of the one or more items stored in the storage structure being less than or equal to a given amount and the expiration of the one or more items stored in the storage structure that falls within the given period, and a suggestion to purchase a product corresponding to the one or more items;

(h) displaying, on the display terminal, the first screen;
(i) receiving, on the display terminal, input indicating an order for the one or more items determined to satisfy the first condition;
(j) based on the input being received on the display terminal, transmitting to the sales server by processor of the information processing apparatus the order for the one or more items;
(k) determining, by a sensor at the storage structure, order fulfilment status indicating whether the order for the one or more items has been delivered to the storage structure;
(l) receiving, by the processor of the information processing apparatus, the order fulfilment status;
(m) determining, by the processor of the information processing apparatus, whether a second condition is satisfied by the order being transmitted to the sales server and based on the order fulfilment status indicating that the order for the one or more items has not been delivered; and
(n) based on the second condition being satisfied, sending a second screen to the display terminal to display that the order for the one or more items has not been delivered to the storage structure and double ordering of the one or more items is inhibited, else the order is determined to have been delivered.

2. The control method according to claim 1, wherein the first screen displays:
the information about the one or more items, the at least one of the amount of the one or more items stored in the storage structure being less than or equal to a given amount and the expiration of the one or more items stored in the storage structure that falls within the given period; and
the suggestion to purchase the product corresponding to the one or more items in order from left to right on the first screen.

3. The control method according to claim 1, further comprising:
(o) further obtaining information, using a camera of the display terminal, about a user located near the display;
(p) processing the information about the user obtained using the camera to determine whether the information about the user satisfies a third condition or not, the third condition indicating that the user has purchasing authority;
(q) when the first condition is satisfied and the third condition is satisfied, displaying, on the display terminal, the first screen including the information about the one or more items, the at least one of the amount of the one or more items stored in the storage structure being less than or equal to a given amount and the expiration of the one or more items stored in the storage structure that falls within the given period; and the suggestion to purchase the product corresponding to the one or more items; and
(r) when at least one of the first condition and the third condition is not satisfied, does not display, on the display terminal, the suggestion to purchase the product corresponding to the one or more items.

4. The control method according to claim 1, further comprising:
(o) further obtaining information, using a camera, about a purchasing authority associated with the display terminal;
(p) providing the information obtained by the camera to the processor of the information processing apparatus;
(q) determining, by the processor of the information processing apparatus, information about whether the information about the purchasing authority satisfies a third condition or not, the third condition indicating that the information about the purchasing authority indicates that purchasing authority is had;
(r) transmitting, by the processor of the information processing apparatus to the display terminal, the determined information about whether the information about the purchasing authority satisfies a third condition or not;
(s) when the first condition is satisfied and the third condition is satisfied, displaying, on the display terminal, the first screen including the information about the one or more items, the at least one of the amount of the one or more items stored in the storage structure being less than or equal to a given amount and the expiration of the one or more items stored in the storage structure that falls within the given period; and the suggestion to purchase the product corresponding to the one or more items; and
(t) when at least one of the first condition and the third condition is not satisfied, does not display, on the display terminal, the first screen including the suggestion to purchase the product corresponding to the one or more items.

5. An information processing apparatus, comprising:
memory configured to store a program; and
at least one processor configured to execute the program to cause the processor to:
(a) configure communication with a storage structure, a display terminal located at the storage structure, and a sales server over a communication network;
(b) receive, over the communication network from the sales server, product information identifying a product corresponding to the one or more items stored in the storage structure;
(c) receive, over the communication network from a sensor at the storage structure, item information including the at least one of the amount of the one or more items stored in the storage structure and the expiration of the one or more items stored in a storage structure that falls within the given period;
(d) determine whether a first condition is satisfied by at least one of the amount of the one or more items stored in the storage structure being less than or equal to a given amount and that the expiration of the one or more items stored in the storage structure falls within the given period;
(e) based on the first condition being satisfied, transmit, over the communication network by the processor to a display terminal, a first screen including information about the one or more items, the at least one of the amount of the one or more items stored in the storage structure being less than or equal to a given amount and the expiration of the one or more items stored in the storage structure falls within the given period, and a suggestion to purchase a product corresponding to the one or more items;
(f) receive, from the display terminal, an order at the processor for the one or more items determined to satisfy the first condition;
(g) transmit, to the sales server, the order for the one or more items determined to satisfy the first condition;

(h) receive, from a sensor at the storage structure, an order fulfillment status indicating whether the order for the one or more items has been delivered to the storage structure;

(i) determine whether a second condition is satisfied by the order being transmitted to the sales server and based on the order fulfilment status indicating that the order for the one or more items has not been delivered; and (j) based on the second condition being satisfied, send a second screen to the display terminal to display that the order for the one or more items has not been delivered to the storage structure and inhibiting double ordering of the one or more items, else the order is determined to have been delivered.

6. The information processing apparatus according to claim 5, wherein the first screen displays:

the information about the one or more items, the at least one of the amount of the one or more items stored in the storage structure being less than or equal to a given amount and the expiration of the one or more items stored in the storage structure that falls within the given period; and the suggestion to purchase the product corresponding to the one or more items in order from left to right on the first screen.

\* \* \* \* \*